(12) United States Patent
Pfannenschmidt et al.

(10) Patent No.: US 10,491,576 B1
(45) Date of Patent: Nov. 26, 2019

(54) SYSTEM AND METHOD FOR SECURITY BREACH RESPONSE USING HIERARCHICAL CRYPTOGRAPHIC KEY MANAGEMENT

(71) Applicant: Intuit Inc., Mountain View, CA (US)

(72) Inventors: Lars Pfannenschmidt, San Francisco, CA (US); Tobias Ullrich, San Francisco, CA (US); Frank Wisniewski, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 266 days.

(21) Appl. No.: 15/625,146

(22) Filed: Jun. 16, 2017

(51) Int. Cl.
*H04L 29/06* (2006.01)
*H04L 9/06* (2006.01)
*G06F 12/14* (2006.01)

(52) U.S. Cl.
CPC ........ *H04L 63/064* (2013.01); *G06F 12/1408* (2013.01); *H04L 9/0618* (2013.01); *H04L 63/061* (2013.01); *G06F 2212/1052* (2013.01)

(58) Field of Classification Search
CPC ... H04L 63/064; H04L 63/061; H04L 9/0618; G06F 12/1408; G06F 2212/1052
See application file for complete search history.

(56) References Cited

U.S. PATENT DOCUMENTS

| | | |
|---|---|---|
| 6,907,127 B1 | 6/2005 | Kravitz et al. |
| 8,601,600 B1 | 12/2013 | Shankar et al. |
| 8,782,441 B1 * | 7/2014 | Osterwalder ....... G06F 21/6218 713/193 |
| 9,413,730 B1 * | 8/2016 | Narayan ............. H04L 63/0471 |
| 9,767,317 B1 | 9/2017 | Chakrovorthy et al. |
| 9,973,481 B1 * | 5/2018 | Sharifi Mehr ........ H04L 9/0822 |
| 10,050,780 B2 * | 8/2018 | Oliver ................. G06F 11/1004 |
| 2006/0101524 A1 | 5/2006 | Weber |
| 2010/0023782 A1 | 1/2010 | Prakash et al. |

(Continued)

FOREIGN PATENT DOCUMENTS

DE    697 36 310    7/2007

OTHER PUBLICATIONS

Barker, E., "Recommendation for Key Management," National Institute of Standards and Technology Special Publication 800-57 Part 1, Revision 4, Jan. 2016.

(Continued)

*Primary Examiner* — Chau Le
(74) *Attorney, Agent, or Firm* — Hawley Troxell Ennis & Hawley LLP; Philip McKay

(57) ABSTRACT

A cryptographic service system rekeys encrypted information that was encrypted at a granular level using hierarchical cryptographic key management. Encrypted information is retrieved from a cloud data store. The encrypted information includes an encrypted data key and an encrypted key-encrypting key. The plain version of the key-encrypting key is received from a key provider. The plain version of the key-encrypting key is used to decrypt the original data key. A new key-encrypting key is retrieved from a local key pool. The new key-encrypting key is used to encrypt the original data key. The original encrypted information is stored with the new encrypted version of the original data key and the encrypted version of the new key-encrypting key.

20 Claims, 12 Drawing Sheets

(56) References Cited

U.S. PATENT DOCUMENTS

| | | | |
|---|---|---|---|
| 2010/0049906 A1* | 2/2010 | Tao | G06F 12/1408 |
| | | | 711/103 |
| 2012/0110318 A1* | 5/2012 | Stone | H04L 9/3234 |
| | | | 713/150 |
| 2013/0227303 A1 | 8/2013 | Kadatch et al. | |
| 2014/0164776 A1* | 6/2014 | Hook | H04L 9/14 |
| | | | 713/171 |
| 2014/0229736 A1 | 8/2014 | Asim et al. | |
| 2014/0321641 A1* | 10/2014 | Khosravi | H04L 63/061 |
| | | | 380/44 |
| 2015/0186657 A1 | 7/2015 | Nakhjiri | |
| 2015/0248673 A1* | 9/2015 | Almohri | G06Q 20/38215 |
| | | | 705/39 |
| 2015/0286839 A1 | 10/2015 | Ben Shalom et al. | |
| 2017/0126644 A1* | 5/2017 | Ullrich | H04L 63/061 |
| 2018/0285602 A1* | 10/2018 | Mersh | G06F 21/33 |
| 2018/0287785 A1 | 10/2018 | Pfannenschmidt et al. | |

OTHER PUBLICATIONS

"Envelope Encryption," [online], [retrieved Mar. 29, 2017]. Retrieved from the Internet https://cloud.google.com/kms/docs/data-encryption-keys.

\* cited by examiner

SYSTEM AND METHOD FOR SECURITY BREACH RESPONSE USING HIERARCHICAL CRYPTOGRAPHIC KEY MANAGEMENT

BACKGROUND

A cloud service provider stores data in the cloud, such that data storage is made available as a service via a network. For example, data logically stored in a virtual storage pool may be physically stored in a physically distributed manner across multiple servers and across multiple geographic locations. Such physical distribution promotes massive scalability based on commodity infrastructure, but leads to increased risk of unauthorized physical access to data. Under a traditional cloud service provider environment, data in the cloud is encrypted to protect against unauthorized data access. For example, encryption of data at rest protects data that is stored at a cloud service provider and encryption of data in transit protects data that is transmitted to and from the cloud service provider. As can be imagined, the vast diversity and quantity of information stored in the cloud is a valuable target for data vandals. In order to promote economic growth and user adoption of cloud services, cloud service providers must be continually vigilant to protect data from unauthorized data breaches.

Cryptographic mechanisms provide security services for electronic data storage, such as data stored in the cloud. Cryptography is the process of encrypting ordinary information, called plaintext, into unintelligible data, called cyphertext, and decrypting the cyphertext back to plaintext. An algorithm is used with auxiliary cryptographic information, such as a cryptographic key, to perform the encryption and decryption. While it may be difficult to keep an algorithm secret, a key is often easier to protect as it is typically a small piece of information that can be changed as needed to prevent security breaches. Keeping keys secret is part of the process of key management, which also includes the secure generation, exchange, storage, distribution, use, replacement, and destruction of keys. Just as a strong safe is only secure if the safe's combination is kept secret, a strong algorithm is directly dependent on secure key management to keep a cryptographic key secret.

In a traditional cryptographic service environment, a key management service provides cryptographic keys. For example, to encrypt plaintext or plain data into cyphertext or cypher data, first a master key is created and identified with a master key identifier. Next, a key can be generated from the master key to encrypt data, and the key management service can return the key both as a plain (unencrypted) key and as a cypher (encrypted) key, which was encrypted by the master key. The plain key can be used to encrypt plain data into cypher data, and the cypher data and the cypher key can be stored together and the plain key can be erased from memory. Later, to decrypt the cypher data, the cypher key can be transmitted to the key management service, which can decrypt the cypher key using the master key and return the plain key. The plain key can then be used to decrypt the cypher data, yielding the original plain data, and the plain key can be erased from memory. This traditional cryptographic service environment is advantageous because it ensures that, should there be unauthorized loss of the cypher data by a data vandal, the cypher data is useless to the vandal who does not possess the applicable key in plain form because only a cypher key in encrypted form is stored with the cypher data. In other words, with a key management system, the long-term storage of a plain key is stored in a different location than the storage of the cypher data, and users must authenticate themselves with the key management service provider to gain access to the plain key in order to decrypt the cypher data.

However, should a data breach of cypher data include access to an applicable plain key, then a vandal can decrypt the cypher data. For example, should a file such as a text document be encrypted, a vandal with the applicable plain key can decrypt the entire file and have access to the entire contents of the file. Similarly, if an entire database is encrypted, and the database consists of cells organized in columns and rows, then a security exploitation by a vandal could result in the vulnerability of all the cells in the database. On the other hand, each cell of a database could be encrypted with its own key, and a security attack by a vandal would limit the vulnerability to a single cell rather than the entire database. Thus, there is a need in the traditional cryptographic service environment to decide the granularity of the data to be protected, such as perimeter security of an entire database or interior security of, for example, tables, columns, rows, and/or cells. This decision of granularity is traditionally based on balancing competing requirements of security and performance.

In a traditional cryptographic service environment, computational performance is degraded by increased security overhead such as increased encryption operations. It is to be understood that sensitive data must be protected, or else an organization may face legal and brand consequences. Yet, if the real-world performance is impacted due to an encryption strategy, then the customer environment can be degraded, such as a restriction in the flow of authorized information, with a resulting market loss in business. In other words, an encryption solution in a traditional environment is not considered successful unless it includes acceptable performance. In a traditional balancing analysis, the encryption of data at a granular level, such as every cell of a database, is traditionally considered to have too large of a performance workload and is thus traditionally considered an unsuccessful solution.

Accordingly, traditional balancing analysis includes an encryption overhead penalty that applies to the balancing of granular security with the cost of performance workload. For example, one form of an overhead penalty that applies to performance workload is responding to a data breach. In a traditional cryptographic service environment, a response team comprising information technology, security, and forensic professionals is typically available on-call for a rapid response to a breach. Despite the response team's best effort to be swift, a response traditionally takes time due to the extensive decisions that must be collectively determined. A response could take a week or more of activities including understanding how an intruder got into the system, analyzing the scope of the breach, and determining the appropriate remediation plan. To aid in the team's investigation, the response team may collect digital clues left behind by vandals and interview staff to understand the sensitivity of the breached data and ascertain the location of such sensitive data.

With a traditional response, the response team must react to each unique breach and determine what data has been compromised. Such determination includes ascertaining the encryption granularity of the compromised data in order to create a remedial plan to re-encrypt the breached data. One traditional balancing approach to encryption granularity is to encrypt an entire database with a single key. This approach has the benefit of having a low overhead penalty for re-encryption because, after decrypting the database, a single new key can be used to re-encrypt the entire database. However, the low overhead penalty is generally considered unbalanced with respect to security because a vandal who steals the single key would have the opportunity to decrypt and access the entire database that could contain, for example, millions of user profiles.

Nevertheless, strengthening security through increasing data granularity can significantly increase the overhead penalty with respect to responding to a data breach with, for example, re-encryption of breached data. This overhead penalty is represented in part by the effort that a response team must expend in order to determine which of the breached data must be re-encrypted with new keys. Under a more balanced approach, some groups of data may be encrypted, such as encryption at the column level. For example, a column of social security numbers may be encrypted into cyphertext, while a column of cities may be left in plaintext or in clear form that is unencrypted. While initially encrypting a group of columns with respective encryption keys strengthens security with an initially low performance overhead, the manual and technical effort to determine which groups of data should be re-encrypted after a breach is significant. Furthermore, after this determination is made, the onerous task of implementing re-encryption processes to re-encrypt selected groups of data further adds to the performance overhead of data re-encryption, which increases the breach response time.

Consequently, there is a long standing technical problem in the data management arts in the form of a need to provide more effective data re-encryption procedures that address computational performance requirements to be able to scale the re-encryption of granular data.

SUMMARY

Embodiments of the present disclosure address some of the shortcomings associated with current cryptographic service environments by providing methods and systems that provide a hierarchy of keys for rekeying granularized data. Under an embodiment, the disclosed cryptographic system provides a data storage service that utilizes a key provider to acquire wrap keys to form a wrap key pool, such as a pool buffer. Under various embodiments, a wrap key is a key-encryption key or a key-wrapping key that is used by a key-wrap algorithm to encrypt another key. Under various embodiments a wrap key may be encrypted by a master key of the key provider. A wrap key from the wrap key pool can be selected to encrypt a data key after the data key is used to encrypt data. The wrap key can be randomly selected or selected based on a distributive rotation of wrap keys in the key pool. Under some embodiments, the data may be classified at a granular level as a data particle, such as a cell of a database, a word of a text document, a single character of a message, a certificate, a configuration item, or the like.

Under an embodiment, a hierarchy of keys can be achieved to encrypt more than one data particle, such as a cell of a database. Such an embodiment transforms the traditional balancing approach between performance and security because a more granular level of security can be realized without sacrificing performance in an unacceptable manner. It is to be understood that the increase in security is due to the reduced impact of a vandal stealing a plain key, because that vandal may be limited to decrypting a single data particle such as a cell, as compared to a whole database or a whole column of data in a traditional cryptographic environment. For example, under an embodiment, a plain data key is generated within the data storage system upon receipt of a request to store a data particle after it is encrypted. It is to be understood that this plain data key is generated without a network call to a key provider. The plain data key that is generated by the data storage system or application is used to encrypt a received data particle. Under an embodiment, that plain data key is not utilized to encrypt any other data particles. After encryption of the data particle with the plain data key, the plain data key is itself encrypted. This encryption of the plain data key is done by choosing a plain wrap key from a pool of such keys.

Under an embodiment, a wrap key pool comprises more than one wrap key. For example, for illustrative purposes, a pool may hold ten wrap keys and each wrap key was received from a key provider. Under an embodiment, the wrap key is received in the form of a tuple of a plain wrap key and a cypher wrap key. It is to be understood that a tuple can be a data type comprising an ordered set of values that, for example, can be used to pass a string of parameters from one system to another. Under an embodiment, the cypher wrap key is not only an encrypted version of the plain wrap key, but it also serves as a unique identifier for the plain wrap key. Under another embodiment, in addition to or instead of a cypher wrap key, the tuple may include an identifier of the plain wrap key that uniquely identifies the plain wrap key and is also uniquely different from the cypher wrap key. Under some embodiments, the pool includes a threshold metric, such as a counter, that can determine whether a threshold or limit of use of a wrap key has been exceeded or reached. For example, if a metric is a counter, a threshold could be determined to allow a wrap key to be used for an encryption operation ten times, a hundred times, or a thousand times, after which a particular wrap key is no longer to be used for encrypting newly generated data keys. After a wrap key has exceeded its threshold of use, the wrap key can be taken out of rotation from the wrap key pool, and a new wrap key can be requested from the key provider. That new wrap key can replace the old wrap key that had exceeded its threshold. In some embodiments, a threshold is applied to each wrap key of a key pool to avoid load spikes on the wrap key pool, such as multiple wrap keys expiring at the same time. In some embodiments, each threshold of each wrap key of a wrap key pool is randomly determined based on a range of allowable thresholds. In some embodiments, instead of randomly selecting thresholds for each wrap key, a random initial value can be assigned to the counter that is used as a threshold metric. For example, an initial value for a first metric may be seven, and an initial value for a second metric may be two.

Under this embodiment, a plain data particle is encrypted by a plain data key that is associated with the plain data particle to form a cypher data particle. It is to be understood that the data particle is not yet sufficiently secure, even though it is encrypted into a cypher data particle, because the plain data key must also be secured. It is also to be understood that performance at this point is not severely impacted because the plain data key was generated without a network call to a key provider. In order to make this system sufficiently secure, the plain data key is encrypted using a wrap key provided by a key provider and stored in a wrap key pool. This wrap key has a reduced negative impact on performance because it is retrieved from a key pool and it is reused until its associated metric indicates that it is no longer to be used. Thus, a hierarchy of keys is disclosed of a data key having a one-to-one relationship with a data particle, a wrap key having a one-to-many relationship with a plurality of data keys, and a master key having a one-to-many relationship with a plurality of wrap keys.

Under an embodiment, the selection of a wrap key from the key pool can be random. This means that, should there be a breach of a wrap key, the impact is to a random set of data particles scattered throughout a data store. For example, if a first data particle is received at a first point in time and it is a social security number for a first user, then it may be encrypted by a data key that is encrypted with a wrap key that was randomly selected. Then, at a second point in time, if a second data particle is received that is a city of a second user, then it may be encrypted by a new data key that is encrypted by the same wrap key that was again randomly selected based on a new wrap key selection. Under this example, the data particles of a first user's social security number and a second user's city that are protected by the random selection of a wrap key are themselves randomly distributed throughout the database. In other words, if a vandal were to gain access to a plain wrap key, the vandal would be able to only decrypt a random group of data particles that had been stored in the cloud data store, thus limiting the harm that the vandal could cause by limiting the vandals from accessing, for example, a complete profile of a user.

It should be appreciated that the disclosed cryptographic system overcomes the performance limitations of encrypting granularized data encountered by a traditional cryptographic system when acquiring a large number of keys from a key provider. Under an embodiment, a key provider may be a third-party service provider such as a key management service from Intuit's Intuit Data Protection Services, HashiCorp's Vault, Google's Cloud KMS, Amazon's AWS Key Management Service, Microsoft's Key Management Service, and the like.

Under another embodiment, a key provider may be part of a service provider's own data center or computing environment. Under this embodiment, the wrap keys may be managed with a Hardware Security Module (HSM) for physical security. It is to be appreciated that although such network calls are private, nevertheless there is a limitation of an HSM's key storage capacity that limits the number of keys that an HSM can store. Furthermore, it is to be appreciated that an HSM has a relatively high sales price. For either an external or internal key provider, the present disclosure includes the use of wrap keys, such as key-encryption keys, to enable a hierarchy of keys.

The embodiments of the present disclosure provide a scalable cryptographic system. For example, a tax software company that provides online tax service has a need to store sensitive information of customers in its data centers. While traffic volume may be relatively light during the year, during tax season traffic can increase substantially to, for example 1,400 transactions per second. Furthermore, the traffic could, during periods of a tax season, be ten times, fifteen times, or twenty times this rate. It is generally considered that traditional cryptographic environments cannot address such a high level of traffic without substantial performance degradation, which would be unacceptable to the tax software company's customers. For example, some traditional key providers are limited to 500 transactions per second, limiting the ability to encrypt data at a granular level such as data particles of tax software and the like.

The disclosed scalable cryptographic system provides the capability of expanding the definition of sensitive information provided by a security policy. For example, under a traditional cryptographic system, a security policy may define a credit card field at a higher security level than an address field. With the present disclosure, a security policy can increase the scale of encrypted fields to higher security levels, such as scaling address fields to be high security levels.

Such may be beneficial, for example, in cases where a financial software company has several business units providing diverse financial software products to the same customers. With this case, it may be beneficial to have a single customer profile that is accessible to all of the diverse business units of the financial software company. However, while there may be a policy that an address field is to contain information related to a postal address, nevertheless a business unit may choose to store a credit card number in the address field. For example, a floral shop that sells flowers to a customer with a typical credit card who typically comes to the store in person may use a different credit card when making deliveries to that customer. The floral shop could enter that different credit card number in the address field even though such entry goes against a security policy. It may therefore be advantageous to classify the address field with a higher level of security due to the unpredictable nature of client usage of the address field of a user's profile, for example.

It is to be understood that the disclosed embodiments may be advantageous at least in the area of data storage as a service. With such a service, the source of the data may be unknown or may be unreliable to follow a security policy with respect to security classification of data. Under this scenario, a data storage service cannot rely on the security policy to define the security level of the information being stored, and thus the impact of a security breach may be substantially increased due, in part, to a client's incorrect classification of secure information.

Under the present disclosure, more weight can be given to increased security due to the scaling capacity achieved under the disclosed embodiments. For example, a one-to-one relationship can be achieved between a data key and a data particle, even when a data particle is a cell in a database, and the database has an extremely large number of cells making up rows times columns in tables. Under a traditional model, a separate network call to an application programming interface (API) would be made to a key provider. Under the disclosed embodiments, the number of network calls to encrypt data particles is reduced to occasional replenishment of wrap keys in the wrap key pool. Other operations can be performed locally, such as retrieving a wrap key from the local wrap key pool and locally generating a data key for each data particle.

Under the present disclosure, more weight can be further given to increased security due to the rekeying capabilities achieved under the disclosed embodiments. It is to be appreciated that when data is encrypted, it is prudent to change the keys used for the encryption. Such rekeying of data is a good practice, similar to end users occasionally changing their passwords to user accounts. For example, just as an end user may not be aware that a password has been compromised and that a vandal is accessing an end user's account, it may not be known that a key has been comprised and that it may not have been detected that a vandal is accessing encrypted data. Similar to changing a password, rekeying encrypted data is a way to prevent an undetected vandal's further access. Under some embodiments, rekeying of encrypted data can be scheduled on a periodic basis such as every thirty days, every two months, every quarter, or the like.

Figure 1:
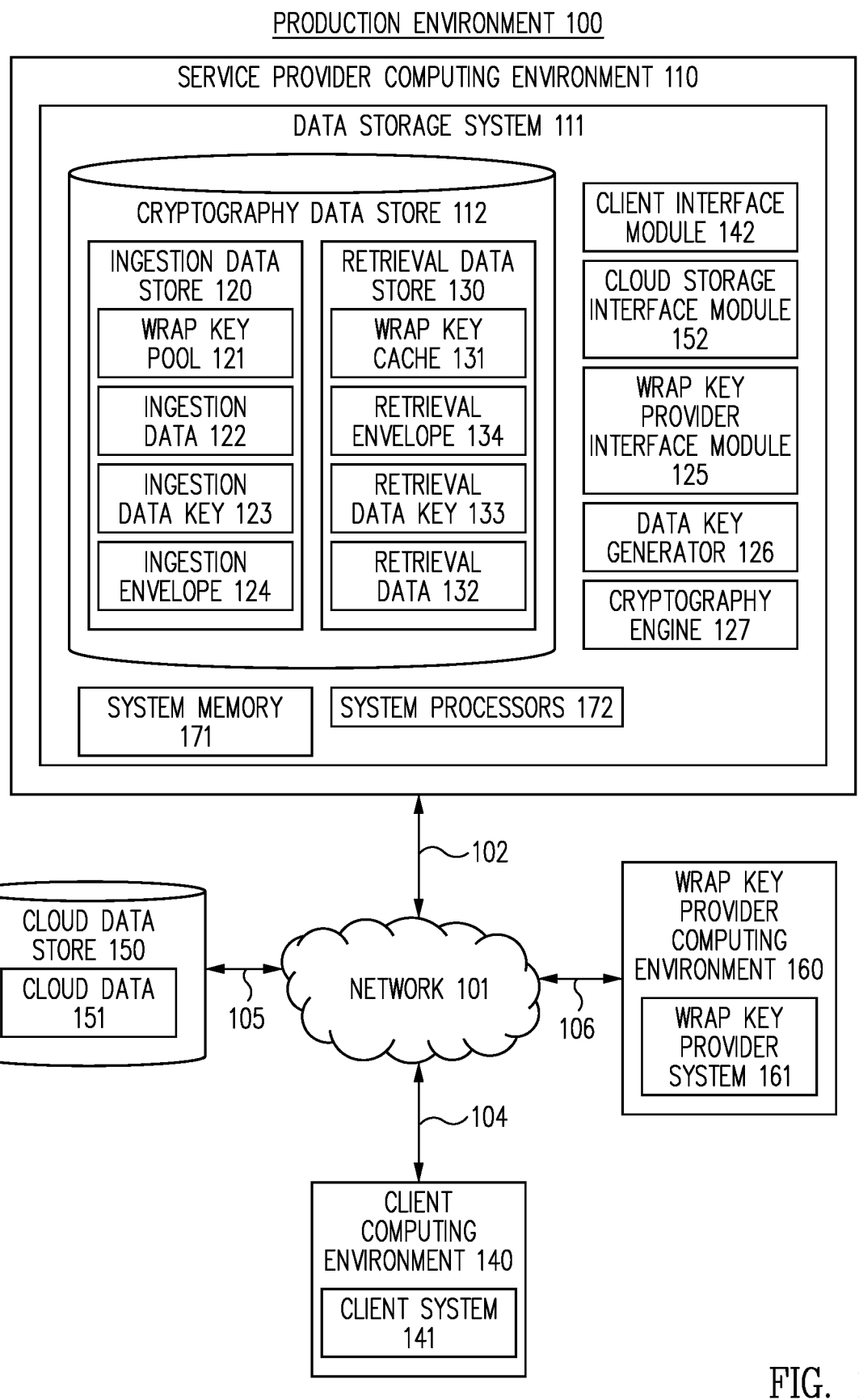
FIG. 1 is a functional block diagram of a production environment for hierarchical cryptographic key management, in accordance with various embodiments.

Common reference numerals are used throughout the figures and the detailed description to indicate like elements. It is to be understood that reference numerals ending in letters as tags are examples of variations of like elements, and the tagged reference numerals may or may not be illustrated in the figures. For example, a first plain data particle 203A and a second plain data particle 203B are both represented in FIG. 2 by the reference numeral of 203, in which the ending letter tags of A and B are not illustrated. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system," "computing device," and "computing entity," include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a Virtual Private Cloud (VPC); or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, communication channel, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, or entities using, or otherwise interacting with any of the methods or systems discussed herein. For instance, in various embodiments, a user can be, but is not limited to, a person, a commercial entity, an application, a service, or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term "data store" or "data storage device" includes, but is not limited to, any physical or virtual data source or storage device. For instance, in various embodiments, a data store or storage container can be, but is not limited to, one or more of a hard disk drive, a solid-state drive, an EEPROM, an optical disk, a server, a memory array, a database, a virtual database, a virtual memory, a virtual data directory, a non-transitory computer-readable medium, or other physical or virtual data sources.

As used herein, the term "file" includes, but is not limited to, a data entity that is a sequence of bytes that can be accessed individually or collectively.

As used herein the term "data object" includes, but is not limited to, a data entity that is stored and retrieved as a whole, or in large chunks, rather than as a sequence of bytes.

Advantages of Certain Embodiments

The disclosed method and system for hierarchical cryptographic key management, including rekeying granularized data, provides for significant improvements to the technical fields of electronic data security, data processing, data management, and user experience. As can be appreciated, under a traditional cryptographic environment, a large volume of keys would be required to encrypt a large volume of data particles, if it would be desired that each data particle is uniquely encrypted in a manner different from other data particles. The disclosed cryptographic system overcomes at least this deficiency through reduction of computer resource utilization by reducing the volume of keys to be acquired from the key provider. The present disclosure provides a cryptographic system that is scalable to securely encrypt granularized data and rekey the granularized data that overcomes deficiencies of traditional cryptographic systems.

A hierarchy of keys is disclosed of a data key having a one-to-one relationship with a data particle, a wrap key having a one-to-many relationship with a plurality of data keys, and a master key having a one-to-many relationship with a plurality of wrap keys. This hierarchy of keys means that a network call to a key provider for a new wrap key occurs relatively infrequently to replace an old wrap key that was used several times. A network call to a key provider is not occurring with each instance of encrypting a data particle, as would occur with a traditional encryption system.

In terms of a balancing analysis discussed above, security has been significantly increased with a comparatively small decrease in performance due to an occasional network call to maintain a fresh set of wrap keys in the key pool. This level of security is achieved in some embodiments by a set of wrap keys kept in a key pool that is replenished after use of each wrap key meets or exceeds a threshold of use of encryption of a plurality of data keys.

It is to be appreciated that the disclosed encryption system addresses some of the shortcomings of a third-party service provider that provides data-encryption keys under the current cryptographic service environments. For example, under a current cryptographic service environment, a public network call is typically made to a third-party key management service for each data particle that is desired to be encrypted, which may cause an unacceptable degradation in system performance due to the increased network traffic of a communication channel and associated response latency. However, the disclosed embodiments enhance the security and reliability of data storage systems and reduce the wasteful use of computing resources in implementing expensive, unwieldy, and insufficient data security procedures. This transforms computing systems with limited processing power and limited memory power into more efficient computing systems.

Under the current disclosure, a high volume of data particles, such as cells of a table, can be scaled to a higher level of security without an unacceptable degradation in performance. Such scaling under the present disclosure can have a result, in many cases, that every cell of a database can be secured while appropriately balancing the tradeoff in performance, when compared to traditional cryptographic systems. It is to be understood that such scaling under the present disclosure is advantageous for internal clients, such as a company's business units, as well as for external clients, such as customers of software applications. With either scenario, the disclosed embodiments can scale to secure all fields that potentially have unanticipated personally identifiable information (PII) that could be exploited by a data vandal. In some embodiments, encrypting all received data can be advantageous to secure all information that is provided by third parties that may not adhere to the information's data classification, such as classifications defined in a Schema API.

The present disclosure is able to overcome a traditional cryptographic system's requirement to determine a balance between the risk of a security breach of data misclassifications and the risk of performance degradation of encrypting such potentially misclassified information. Under the present disclosure, one can assume a worst-case scenario that all data is misclassified and all data can be treated as requiring security through encryption. Furthermore, because it can be expensive to store keys with a key provider, the storage cost of storing a large volume of keys with a key provider is reduced because there are fewer keys to be stored with the key provider.

Under some embodiments, an emergency rekeying of encrypted data can be scheduled in response to a known, detected, or suspected security incident. For example, after a security incident is detected, a response team may determine that all encrypted data must be re-encrypted as quickly as possible. It is to be understood that the disclosed embodiments may be advantageous over traditional cryptographic systems due to the traditional system's synchronization deficiencies based on the requirement to lock data from access during re-encryption. For example, under a traditional cryptographic system, when re-encrypting data, the traditional system typically prevents access to data that is being re-encrypted to prevent a service from attempting to decrypt the data with the prior key while a new key is being utilized for re-encryption. Under such a synchronization deficiency of a traditional cryptography system, a service that is attempting to serve encrypted data to a client in decrypted form is unable to do the necessary decryption due to unsynchronized re-encryption.

Certain embodiments of the present disclosure are able to overcome a traditional cryptographic system's synchronization deficiencies. Under the present disclosure, synchronization of a re-encryption process can be achieved through use of re-encryption with a different wrap key. Under an embodiment, initial encryption can occur when a plain data particle is encrypted by a plain data key to form a cypher data particle, and the plain data key is encrypted using an original wrap key provided by a key provider to from an original cypher data key. When re-encryption is desired, the cypher data key can be decrypted by the original wrap key, a new wrap key can be provided by the key provider, and the new wrap key can re-encrypt the plain data key to form a new cypher data key. Such may be beneficial because such re-encryption did not involve re-encrypting the data particle because the original plain data key is continuing to be utilized after the re-encryption process, thus limiting synchronization to the wrap key in some embodiments. Accordingly, such embodiments can overcome the synchronization deficiencies of traditional cryptography systems that could cause encrypted data to be unable to be decrypted during a traditional re-encryption process due to the need to lock the data being re-encrypted.

Rekeying granularized data with hierarchical cryptographic key management is a technical solution to a long standing technical problem and is not an abstract idea for at least a few reasons. First, rekeying granularized data with hierarchical cryptographic key management is not an abstract idea because it is not merely an idea itself (e.g., can be performed mentally or using pen and paper). Second, rekeying granularized data with hierarchical cryptographic key management is not an abstract idea because it is not a fundamental economic practice (e.g., is not merely creating a contractual relationship, hedging, mitigating a settlement risk, etc.). Third, rekeying granularized data with hierarchical cryptographic key management is not an abstract idea because it is not a method of organizing human activity (e.g., managing a game of bingo). Fourth, although mathematics may be used in rekeying granularized data, the disclosed and claimed method and system of rekeying granularized data with hierarchical cryptographic key management is not an abstract idea because the method and system is not simply a mathematical relationship/formula.

In addition, rekeying granularized data with hierarchical cryptographic key management is not an abstract idea because improving the security of clients' data allows for significant improvement to the technical fields of user experience, customer service, customer retention, and electronic data management, according to one embodiment. The present disclosure adds significantly to the field of electronic data storage because the disclosed data storage system: decreases the likelihood that a user will be forced to undergo the psychological insecurity of learning that their personal data may have been compromised; increases the likelihood that users will not suffer harmful real world consequences from their personal data actually being obtained and exploited by vandals; and increases the likelihood of improving/maintaining a client's trust in the data storage system, according to one embodiment.

As a result, embodiments of the present disclosure allow for reduced usage of processor cycles, memory, and power consumption, by reducing the time and resources spent by data storage systems to increase access controls and other aspects of data security to compensate for deficient data encryption. Consequently, computing and communication systems implementing or providing the embodiments of the present disclosure are transformed into more operationally efficient devices and systems.

In addition to improving overall computing performance, rekeying granularized data with hierarchical cryptographic key management significantly improves the field of data storage systems by reducing the inefficient and ad-hoc nature of data encryption management, according to one embodiment. Therefore, both human and non-human resources are utilized more efficiently. Furthermore, by rekeying granularized data with hierarchical cryptographic key management, loyalty in the data storage system is increased, which results in repeat customers, efficient encryption and security practices, and reduced abandonment of use of the data storage system, according to one embodiment.

The disclosed method and system for hierarchical cryptographic key management, including rekeying granularized data, provides for the processing and storage of smaller packets of data related to security systems with fewer network calls, i.e., fewer demands on processing power are required by security systems and less effective security measures can be discarded; thereby eliminating unnecessary data analysis to balance processing power against data security risks. Consequently, using the disclosed method and system for hierarchical cryptographic key management, including rekeying granularized data, results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for hierarchical cryptographic key management, including rekeying granularized data.

The disclosed embodiments provide one or more technical solutions to the technical problem of security deficiencies in data storage systems by rekeying granularized data with hierarchical cryptographic key management. These and other embodiments of the data storage system are discussed in further detail below.

Hardware Architecture

FIG. 1 is a functional block diagram of a production environment 100 for hierarchical cryptographic key management, in accordance with various embodiments. Embodiments of the present disclosure provide methods and systems for a data storage system having an application library providing a service, for example, through an application programming interface (API). The application library encrypts and decrypts data having a granularity at the particle level, such as the cells of a database. The application library makes network calls to a key provider, which may be an external service provider of cryptographic wrap keys having an encrypted form of a cypher wrap key and having a decrypted form of a plain wrap key. The application library uses the provided cryptographic wrap keys as key-encryption keys to encrypt data keys, that may be generated by the application library. A plain wrap key may be used to encrypt a plain data key into an encrypted form of a cypher data key. A plain data key may be used to encrypt a plain data particle into an encrypted form of a cypher data particle, after which the cypher wrap key, the cypher data key, and the cypher data particle may be stored together as an envelope object. Thereafter, the cypher data particle can be decrypted by, for example, requesting from the key provider a plain version of the wrap key, such as using the cypher wrap key to identify the wrap key. Upon receipt of the plain wrap key, the cypher data key can be decrypted into a plain data key, after which the cypher data particle can be decrypted with the plain data key.

The service provider production environment 100 includes a service provider computing environment 110, a client computing environment 140, a cloud data store 150, and a wrap key provider computing environment 160. The various computing environments of the service provider production environment 100 are coupled together by one or more physical or virtual networks 101. The computing environments 110, 140, 150, and 160 are communicatively coupled to each other through network 101, with the communication channel 102, the communication channel 104, the communication channel 105, and the communication channel 106, according to one embodiment.

The service provider computing environment 110 represents one or more computing systems such as a server or distribution center that is configured to receive, execute, and host one or more data storage systems, according to one embodiment. The computing environment 110 represents a traditional data center computing environment, a virtual asset computing environment (e.g., a cloud computing environment), or a hybrid between a traditional data center computing environment and a virtual asset computing environment, according to one embodiment.

The service provider computing environment 110 includes a data storage system 111. The data storage system 111 may include a client interface module 142, a cloud storage interface module 152, a wrap key provider interface module 125, a data key generator 126, a cryptography engine 127, and a cryptography data store 112. The cryptography data store 112 may include an ingestion data store 120 and a retrieval data store 130. The ingestion data store 120 may include storage of a wrap key pool 121, ingestion data 122, an ingestion data key 123, and an ingestion envelope 124. It is to be understood that under various embodiments, data ingestion is a process for obtaining, importing, and processing data for later storage in a data store, such as the cloud data store 150. The retrieval data store 130 may include storage of a wrap key cache 131, a retrieval envelope 134 that may correspond to an ingestion envelope 124, a retrieval data key 133 that may correspond to the ingestion data key 123, and retrieval data 132. It is to be understood that under various embodiments, data retrieval is a process for obtaining data stored in a data store, such as the cloud data store 150. The cloud data store 150 includes storage of cloud data 151. The data storage system 111 can interface with the cloud data store 150 through the cloud storage interface module 152. The service provider computing environment 110 includes system memory 171 and system processors 172. In various embodiments, the data storage system 111 is implemented using data that is stored at least in part in the system memory 171, which includes non-transitory and transitory memory, and is executed at least in part by the system processors 172.

In some embodiments, the data storage system 111 may be represented as an application library that provides storage services to a client system 141 of the client computing environment 140. In some embodiments, the client system 141 may be represented as a client application. It is to be understood that such a client application may be associated with hardware residing in any location, such as the same computer hardware as the data storage system 111, or different computer hardware connected through the network 101. Furthermore, although not shown, the client system 141 and the data storage system 111 may be within the same computing environment, including being part of a common overall application.

The client system 141 may interface with the data storage system 111 through a client interface module 142 of the data storage system 111. Through the client interface module 142, the client system 141 may transmit a write request that requests that data be encrypted and stored by the data storage system 111. With the write request, the client system 141 may transmit the applicable data to be stored. In various embodiments, the data may be transmitted from the client system 141 to the data storage system 111 using a representational state transfer (REST) layer. In various embodiments, the data may be transmitted from the client system 141 to the data storage system 111 using a secure transfer methodology such as transport layer security (TSL), secure sockets layer (SSL), and the like. It is to be understood that the data can be received in any form, including plain data that is granularized at a reduced level. Such granularized data may be a particle of data such as a word of a text document, a cell of a table, or the like. When the transmitted data is received by the data storage system 111, it may be stored as ingestion data 122, and may be considered as sensitive data. For example, if it is plain data in unencrypted or plaintext form, the plain data may be stored in volatile memory such as random access memory (RAM) or another temporary store that is considered volatile or short-term. Under some embodiments, data stored in volatile memory can be accessed directly by a central processing unit (CPU) as an address in a register. In this embodiment, the plain data is generally not stored in persistent storage such as a hard disk drive (HDD), a solid state drive (SDD), a flash-based drive, an optical drive, or another persistent store that is considered nonvolatile or long-term.

After the ingestion data 122 is received, a data key is generated by the data key generator 126 and stored as an ingestion data key 123, which is stored in volatile memory and not persistent storage. A data key is a cryptographic key that, in conjunction with a cryptographic algorithm, can encrypt and decrypt data. For example, an entity with knowledge of a data key can reproduce, reverse, or verify a cryptographic operation, while an entity without knowledge of the data key cannot. It is to be understood that under such embodiments, the data key is generated using the entropy of the data storage system 111 that is collected from the randomness of the operating system of applications of the data storage system 111. In various embodiments, encryption is the transformation of plain or unencrypted data into cypher or encrypted data. In various embodiments, decryption is the transformation of cypher or encrypted data into plain, decrypted, or unencrypted data.

It is to be understood that cryptographic algorithms come in many forms and require different elements in order to perform cryptographic operations. For example, some cryptographic algorithms not only include a key but also include other cryptographic material such as an initialization vector (IV). An initialization vector may be used with symmetric encryption methodologies such as an algorithm of the Advanced Encryption Standard (AES) and a block cypher mode of Cipher Block Chaining (CBC). Under this methodology, the initialization vector serves as random material that is ancillary to a key. Under an embodiment, there would be an initialization vector for encrypting the ingestion data key 123 and another initialization vector for encrypting the ingestion data 122, and both initialization vectors would be stored with the encrypted data key and the encrypted ingestion data in order to decrypt them at a later time. It is to be understood that other methodologies may have other cryptographic material requirements, for example the requirements under the Galois/Counter Mode (GCM). Under various embodiments, the ingestion data key 123 is generated specifically for the received ingestion data 122, such that it can be considered that there is a one-to-one relationship between the generated ingestion data key 123 and the received ingestion data 122. It is to be understood that under some embodiments, there may be a one-to-many relationship between the generated data key 123 and a plurality of received ingestion data 122. For example, where the received ingestion data 122 comprises individual letters of a word, those letters may be grouped together as the word and each may be encrypted by the data key. Furthermore, two or more data particles may be combined to form the received ingestion data 122 before being encrypted by the generated data key 123.

After the ingestion data key 123 is generated, it can be used by the cryptography engine 127 to encrypt the plain ingestion data 122 and transform it into cypher data. The cypher data may be stored in persistent storage because the cypher data is in an encrypted form. The persistent storage can include a database, a messaging system, and the like. It is to be understood that after encryption of the plain ingestion data 122, the ingestion data key 123 itself can be considered secret information as it can be used to decrypt the cypher ingestion data 122. Under various embodiments, the ingestion data key 123 can be encrypted to protect its secret. Under some embodiments, a data key that has been encrypted using a security function has had the value of the underlying plain data key disguised as a cypher data key.

Under various embodiments, the ingestion data key 123 is encrypted with a wrap key from the wrap key pool 121. The wrap key pool is a data structure which holds a plurality of keys that have been provided by the wrap key provider system 161. The data structure includes a field for the plain version of a wrap key and a cypher version of the wrap key. Both a plain wrap key and a cypher wrap key are received from the wrap key provider system 161 and stored in association with each other in the wrap key pool 121. The plain wrap key is used to encrypt the plain version of the ingestion data key 123 by the cryptography engine 127, which transforms it into a cypher version of the ingestion data key 123. While the plain version of the ingestion data key 123 was stored in volatile memory and not in persistent storage, the cypher version of the ingestion data key 123 may be stored in persistent storage as well as in volatile memory. Accordingly, the cloud storage interface module 152 may associate together the cypher version of the ingestion data 122, the cypher version of the ingestion data key 123, and the cypher version of the wrap key to form an ingestion envelope 124, for example. It is to be understood that the ingestion envelope 124 may include other cryptography elements and/or material, such as an identifier of the wrap key, an initialization vector, metadata such as encryption date and time, and the like.

It is to be understood that the ingestion envelope 124 contains, at least in part, the information to decrypt the encrypted ingestion data 122. For example, after the ingestion envelope 124 is stored in the cloud data store 150, it can be retrieved from the cloud data store 150 as a retrieval envelope 134. The cypher wrap key of the retrieval envelope 134 can be used as an identifier to retrieve the plain wrap key either from the wrap key cache 131 of the data storage system 111 or from the wrap key provider system 161. After receiving the plain wrap key that is associated with the cypher wrap key, the cryptography engine 127 can decrypt the cypher data key 133 of the retrieval envelope 134 and output a plain retrieval data key 133 that corresponds to the plain ingestion data key 123. The plain retrieval data key 133 can then be used by the cryptography engine 127 to decrypt the cypher version of the retrieval data 132 to output the plain version of the retrieval data 132. The plain retrieval data 132 can then be transmitted to the client system 141 via the client interface module 142.

Under various embodiments, the wrap key pool 121 includes a plurality of wrap keys in the form of a plain version and a cypher version, and this pair can be considered a double tuple. Under some embodiments, the cypher version of the wrap key can be used as an identifier of the wrap key. Under other embodiments, the wrap key pool 121 can include an identifier for the wrap key, such that the identifier and the plain and cypher versions of the wrap key make a triple tuple. Under other embodiments, the identifier of the wrap key can replace the cypher wrap key such that the wrap key identifier and the plain version of the wrap key form a double tuple. It is to be understood that other information and other combinations of versions of wrap keys may be included in a tuple of the wrap key.

Under various embodiments, the wrap key pool 121 includes a metric for each wrap key. In various embodiments, the metric can be a counter that counts how many times a wrap key was used to encrypt a data key. For example, each wrap key may be used according to a determined distribution, such as a random distribution. Under a random distribution, a wrap key may be randomly selected to encrypt a data key, and the counter for that selected wrap key may be incremented by a value of one. For example, the first time a wrap key is used for encrypting a data key, the counter is transformed from zero to one. The second time that a wrap key is used, the counter is transformed from one to two. The third time that a wrap key is used, the counter is transformed from two to three. Under this embodiment, when a counter exceeds a threshold, the wrap key is erased from the key pool and replaced with a new wrap key in the form of a tuple from the wrap key provider system 161. In some embodiments, the erasure from the wrap key pool is immediate. In other embodiments, erasure from the wrap key pool may be delayed. For example, a time period may be determined for the erasure to occur, and erasure may occur after the time period expires. Under this example, until that time period expires, the respective wrap key may continue to be selected. In some embodiments, the threshold value can be a determined number such as two times, five times, ten times, one hundred times, a thousand times, and so on.

In the above example, if the threshold were three and the counter had reached a value of three, the next use would cause the counter to exceed the threshold of three by having a value of four. Under this scenario, the wrap key is removed from the wrap key pool 121 and a new wrap key is requested from the wrap key provider system 161 to replenish the discarded wrap key. This advantageously keeps the wrap key pool 121 continually refreshed with fresh wrap keys. It is to be understood that this refreshment of wrap keys prevents the wrap key pool 121 from becoming stale with wrap keys that have been used too many times and thus reducing the impact of a wrap key being stolen or compromised by a data vandal. In various embodiments, when a wrap key is taken out of rotation and is removed from the wrap key pool 121, it can be erased from memory by overwriting the wrap key with other values, such as zeros. Such may be advantageous to protect the wrap key in the event of a vandal performing a memory dump, for example, of volatile memory.

In various embodiments, a wrap key is received from the wrap key provider system 161 as a tuple that includes a plain wrap key and a cypher wrap key. Although not shown, in some embodiments the plain wrap key is encrypted through the use of a master key. The master key is used by the key provider to encrypt and decrypt a wrap key as part of the key management service of the wrap key provider system 161. In some embodiments, in order to retrieve a wrap key from the wrap key provider system 161, the data storage system 111 can be authorized or can authenticate itself with the wrap key provider system 161. In some embodiments, authentication includes an identifier of a wrap key or the encrypted wrap key. When decrypting data, if authentication is achieved with the wrap key provider system 161, the wrap key provider system 161 can return the plain version of the wrap key which enables decryption of the decrypted data key, and which thus enables decryption of the decrypted data.

In various embodiments, the cloud data 151 that has been encrypted may be re-encrypted with new wrap keys. For example, a retrieval envelope 134 may be retrieved from the cloud data store 150. The cypher wrap key can be extracted from the retrieval envelope 134. The plain version of the extracted wrap key can either be found in the wrap key cache 131, or it can be requested from the wrap key provider system 161. A cypher retrieval data key 133 can be extracted from the retrieval envelope 134. The plain wrap key can be used by the cryptography engine 127 to decrypt the cypher retrieval data key 133 into a decrypted form as a plain retrieval data key 133. The cypher retrieval data 132 can be extracted from the retrieval envelope 134. The plain retrieval data key 133 can be used by the cryptography engine 127 to decrypt the cypher retrieval data 132 into a decrypted form as plain retrieval data 132. The plain retrieval data 132 can be considered to be the plain ingestion data 122, under this embodiment. The plain ingestion data 122 can be encrypted by a new ingestion data key 123 generated by the data key generator 126 and the old retrieval data key 133 can be discarded. The ingestion data key 123 can be encrypted using a new wrap key from the wrap key pool 121. The new cypher wrap key of the wrap key pool 121, the new cypher ingestion data key 123, and the new cypher ingestion data 122 can be stored as an ingestion envelope 124 in the cloud data store 150.

For further example, a retrieval envelope 134 may be retrieved from the cloud data store 150. The cypher wrap key can be extracted from the retrieval envelope 134. The plain version of the extracted wrap key can either be found in the wrap key cache 131, or it can be requested from the wrap key provider system 161. A cypher retrieval data key 133 can be extracted from the retrieval envelope 134. The plain wrap key can be used by the cryptography engine 127 to decrypt the cypher retrieval data key 133 into a decrypted form as a plain retrieval data key 133. In this example, the retrieval data 132 need not be decrypted, and the cypher retrieval data 132 can be considered to be the cypher ingestion data 122, and the plain retrieval data key 133 can be considered to be the plain ingestion data key 123, under this embodiment. The plain ingestion data key 123 can be re-encrypted using a new wrap key from the wrap key pool 121 to form a new cypher ingestion data key 123. The new cypher wrap key of the wrap key pool 121, the new cypher ingestion data key 123, and the original cypher ingestion data 122 can be stored as an ingestion envelope 124 in the cloud data store 150.

As illustrated, the disclosed embodiments for re-encryption can facilitate the rekeying of data particles stored in the cloud data store 150.

Encryption Process

Figure 2:
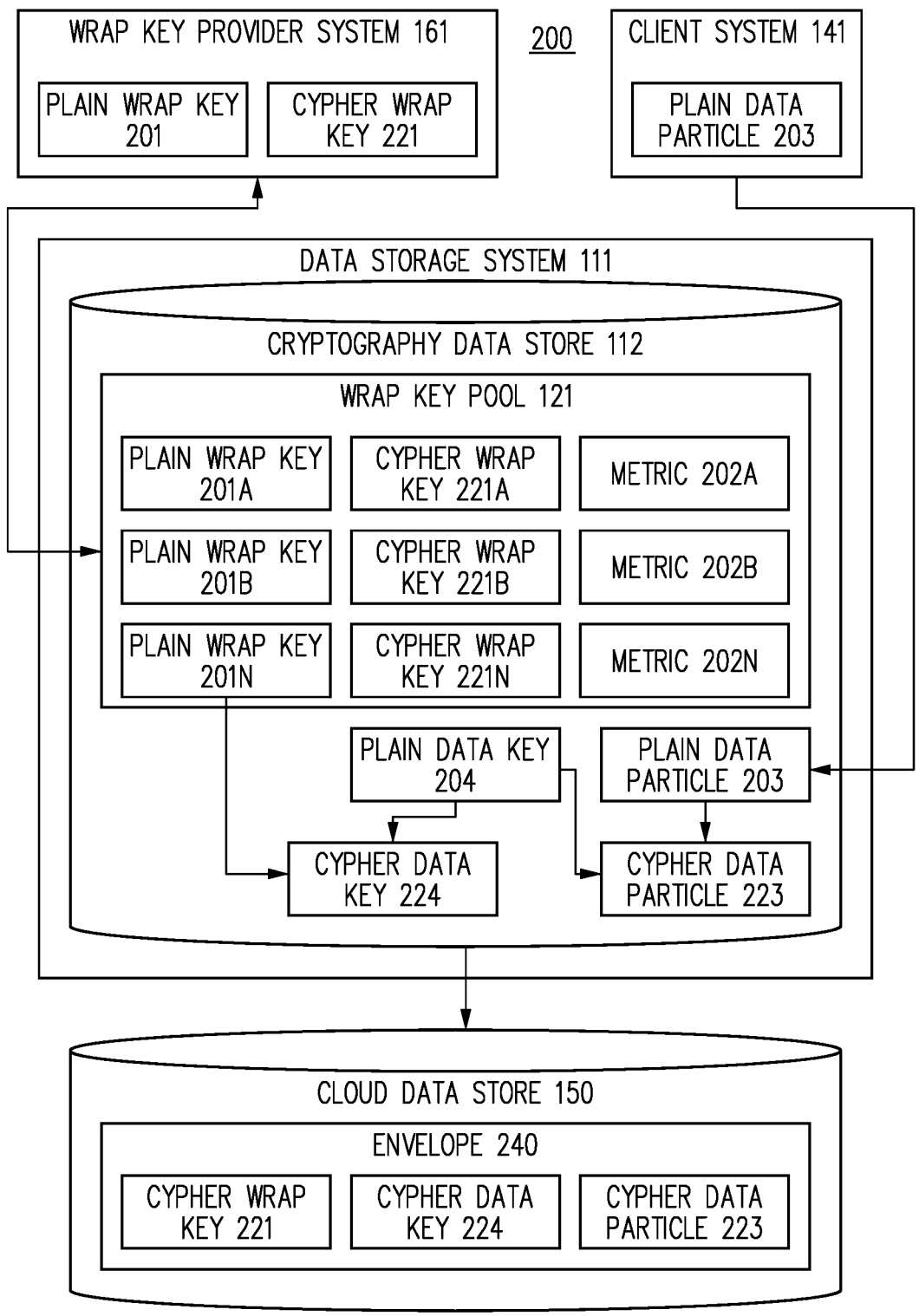
FIG. 2 is a data block diagram of a process for encrypting data with hierarchical cryptographic key management, in accordance with various embodiments.

FIG. 2 is a data block diagram of a process 200 for encrypting data with hierarchical cryptographic key management, in accordance with various embodiments. The client system 141 transmits a plain data particle 203 to the data storage system 111, which stores the plain data particle 203 in volatile memory of the cryptography data store 112. The data storage system 111 generates a plain data key 204, which is stored in volatile memory of the cryptography data store 112.

The data storage system 111 maintains a wrap key pool 121 within the cryptography data store 112. The wrap key pool 121 is repeatedly being replenished with new wrap keys from the wrap key provider system 161. Upon a request from the data storage system 111, the wrap key provider system 161 generates a plain wrap key 201 and encrypts it into a cypher wrap key 221. As depicted, the wrap key pool 121 can hold a plurality of plain wrap keys such as a plain wrap key 201A, a plain wrap key 201B, a plain wrap key 201N, and so on. As further depicted, the wrap key pool 121 can hold a plurality of associated cypher wrap keys such as a cypher wrap key 221A, a cypher wrap key 221B, a cypher wrap key 221N, and so on. The plain wrap key 201 and the cypher wrap key 221 are transmitted to the data storage system 111 as a double tuple, which is stored in the wrap key pool 121. Under some embodiments, the wrap key pool 121 can store a determined number of wrap keys, and in other embodiments, the number of wrap keys in the wrap key pool 121 may change based on the volume of plain data particles 203 to be encrypted. For example, a concurrent mechanism, such as a queue, can monitor the size of the wrap key pool 121 and if more wrap keys are required, additional wrap keys can be received from the wrap key provider system 161. If there are not enough wrap keys in the wrap key pool 121, an error state can be generated. The plain wrap key 201 may be stored in volatile memory of the cryptography data store 112 and the cypher wrap key 221 may be stored in persistent storage of the cryptography data store 112.

The data storage system 111 may encrypt the plain data particle 203 using the plain data key 204 to form a cypher data particle 223, which may be stored in persistent storage of the cryptography data store 112. After encryption of the plain data particle 203, it may be erased from the volatile memory of the cryptography data store 112. After encryption of the plain data particle 203, the plain data key 204 may be encrypted with a selected plain wrap key 201 to form a cypher data key 224, which may be stored in persistent memory. After encryption of the plain data key 204, it may be erased from the volatile memory of the cryptography data store 112.

Under some embodiments, the wrap key pool 121 may include a plurality of metrics 202, and each metric 202 may be associated with a respective plain wrap key 201. As depicted, the wrap key pool 121 can hold a plurality of metrics such as a metric 202A, a metric 202B, a metric 202N, and so on. After encryption of the plain data key 204, a metric 202 associated with the selected plain wrap key 201 may be modified to reflect the use of the selected plain wrap key 201. For example, if the metric 202 is a counter, it is incremented by one count. If the metric 202 exceeds a threshold value, the associated plain wrap key 201 and the associated cypher wrap key 221 are erased, and a new plain wrap key 201 and a new cypher wrap key 221 is requested from the wrap key provider system 161 to be placed in the wrap key pool 121.

The data storage system 111 associates the cypher data particle 223 with the cypher data key 224 and associates the cypher data key 224 with the cypher wrap key 221, and stores the cypher data particle 223, the cypher data key 224, and the cypher wrap key 221 as an envelope 240 to be stored at the cloud data store 150. It is to be understood that the envelope 240 may include other cryptographic material such as one or more initialization vectors, an identifier of the cypher wrap key 221, and the like.

Figure 3:
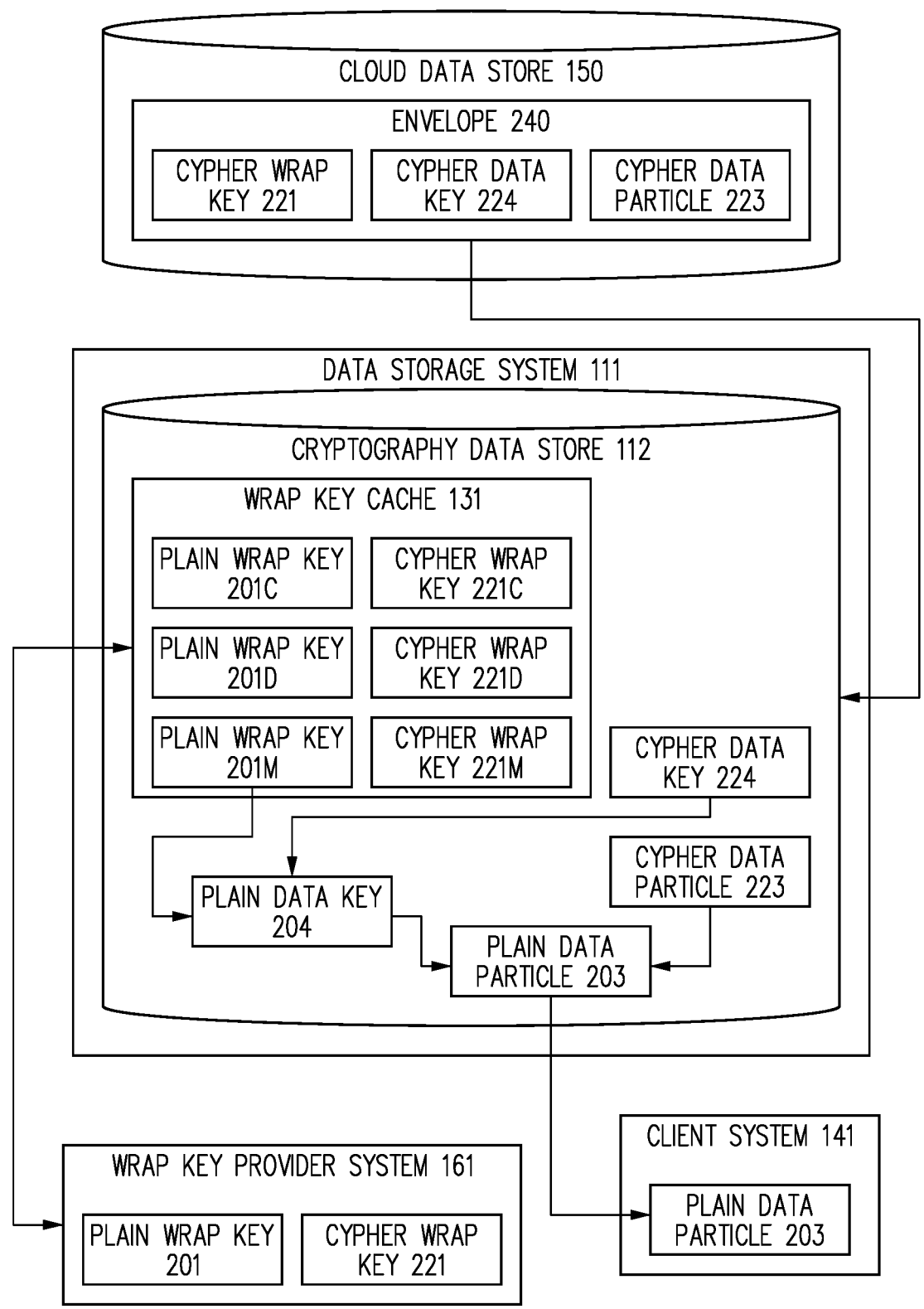
FIG. 3 is a data block diagram of a process for decrypting data with hierarchical cryptographic key management, in accordance with various embodiments.

FIG. 3 is a data block diagram of a process 300 for decrypting data with hierarchical cryptographic key management, in accordance with various embodiments. The data storage system 111 receives the envelope 240 from the cloud data store 150. The envelope 240 includes the cypher wrap key 221, the cypher data key 224, and the cypher data particle 223. The data storage system 111 may store the cypher wrap key 221, the cypher data key 224, and the cypher data particle 223 in persistent storage of the cryptography data store 112.

In some embodiments, the wrap key cache 131 of the cryptography data store 112 includes a plurality of wrap keys in the form of a plain wrap key 201, which may be stored in volatile memory of the cryptography data store 112, and an associated cypher wrap key 221, which may be stored in persistent storage of the cryptography data store 112. As depicted, the wrap key cache 131 can hold a plurality of plain wrap keys such as a plain wrap key 201C, a plain wrap key 201D, a plain wrap key 201M, and so on. As further depicted, the wrap key cache 131 can hold a plurality of associated cypher wrap keys such as a cypher wrap key 221C, a cypher wrap key 221D, a cypher wrap key 221M, and so on. If the cypher wrap key 221 is stored in the wrap key cache 131, then the associated plain wrap key 201 is utilized to decrypt the cypher data key 224 to form the plain data key 204.

Alternatively, if the cypher wrap key 221 is not within the wrap key cache 131, then the data storage system 111 can make a request to the wrap key provider system 161 for the plain wrap key 201 that is associated with the cypher wrap key 221. It is to be understood that the wrap key cache 131 is an optimization to the process 300 and may be omitted. With such an omission, a search of the key cache for a plain wrap key 201 is omitted and a request for the plain wrap key 201 is transmitted to the wrap key provider system 161 including the cypher wrap key 221 as an identifier to identify the plain wrap key 201 to be returned.

In some embodiments, the request includes authentication and/or authorization of the data storage system 111 to make the request to the wrap key provider system 161. In some embodiments, the cypher wrap key 221 serves to identify the plain wrap key 201 that is to be returned. In other embodiments, an identifier of the plain wrap key 201 serves to identify the plain wrap key 201 that is to be returned. In some embodiments, a master key is utilized by the wrap key provider system 161 to decrypt the cypher wrap key 221 to form the plain wrap key 201. In some embodiments, after the plain wrap key 201 is determined, it is transmitted to the data storage system 111. Upon receipt of the plain wrap key 201, it may be stored in the wrap key cache 131. In some embodiments, an associated cypher wrap key 221 is received and stored in the wrap key cache 131. A plain wrap key 201 and its associated cypher wrap key 221 may be stored in the wrap key cache 131 for a determined period, for example for five minutes to ten minutes or some other length of time that allows it to be used more than once without making another network call to the wrap key provider system 161. In some embodiments, a certain number of last recently used wrap keys may be stored in the wrap key cache 131. In some embodiments, a certain number of least recently used wrap keys may be removed from the wrap key cache 131.

The data storage system 111 may use the plain wrap key 201 that is associated with the cypher wrap key 221 to decrypt the cypher data key 224 to form the plain data key 204. The plain data key 204 may be stored in volatile memory of the cryptography data store 112. The data storage system 111 may use the plain data key 204 to decrypt the cypher data particle 223 to form the plain data particle 203. The plain data particle 203 may be stored in volatile memory of the cryptography data store 112. The data storage system 111 may transmit the plain data particle 203 to the client system 141.

Figure 4:
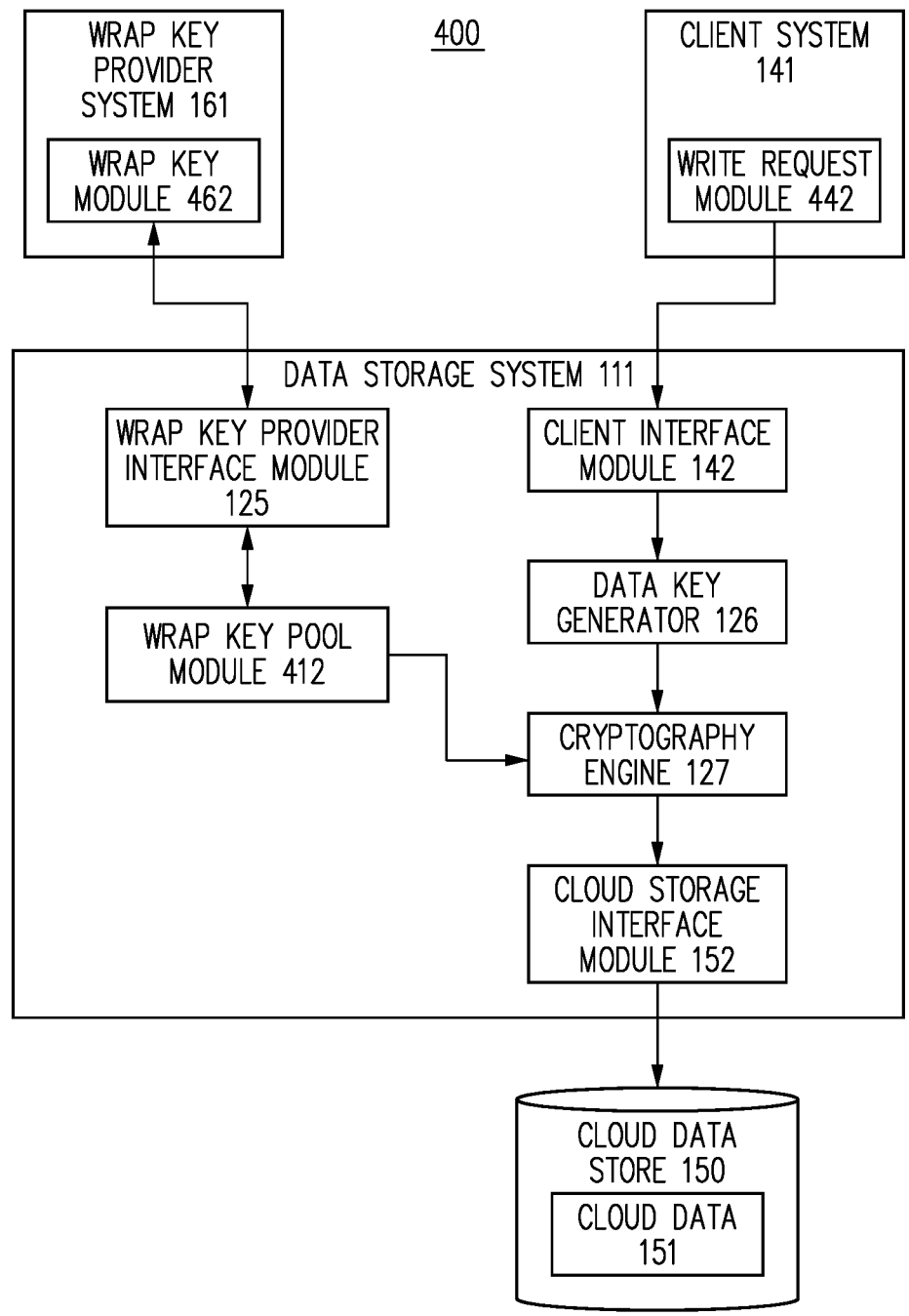
FIG. 4 is a functional block diagram of a process for encrypting data with hierarchical cryptographic key management, in accordance with various embodiments.

FIG. 4 is a functional block diagram of a process 400 for encrypting data with hierarchical cryptographic key management, in accordance with various embodiments. Referring to FIGS. 1, 2, and 4 together, the client interface module 142 of the data storage system 111 receives a write request from a write request module 442 of the client system 141. The received write request may include a plain data particle 203.

A write request module 442 of the client system 141 may make a write request to the data storage system 111 and may transmit the plain data particle 203 to be written. The plain data particle 203 may be received by the client interface module 142. The data key generator 126 may generate a plain data key 204, and the cryptography engine 127 may encrypt the plain data particle 203 with the plain data key 204 to form the cypher data particle 223. In some embodiments, the data key generator 126 resides with the client system 141, and the generated plain data key 204 may be transmitted to the data storage system 111 via the write request module 442. A wrap key pool module 412 of the data storage system 111 may manage the wrap key pool 121 and select a plain wrap key 201 and an associated cypher wrap key 221. In some embodiments, the wrap key pool module 412 manages a thread-safe mechanism for multiple threads with the key pool, such as a buffer that is consumed with multiple threads. The wrap key pool module 412 may also update or modify the metric 202 and, if a threshold is exceeded, erase the plain wrap key 201 and the associated cypher wrap key 221. The wrap key provider interface module 125 may transmit a request for a new plain wrap key 201 and an associated cypher wrap key 221 from a wrap key module 462 of the wrap key provider system 161.

The cryptography engine 127 may use the selected plain wrap key 201 to encrypt the plain data key 204 to form the cypher data key 224. The cloud storage interface module 152 may transmit the envelope 240 to the cloud data store 150 to be stored as the cloud data 151. In various embodiments, the envelope 240 includes the cypher wrap key 221, the cypher data key 224, and the cypher data particle 223. In some embodiments, the envelope 240 includes additional cryptography material.

Figure 5:
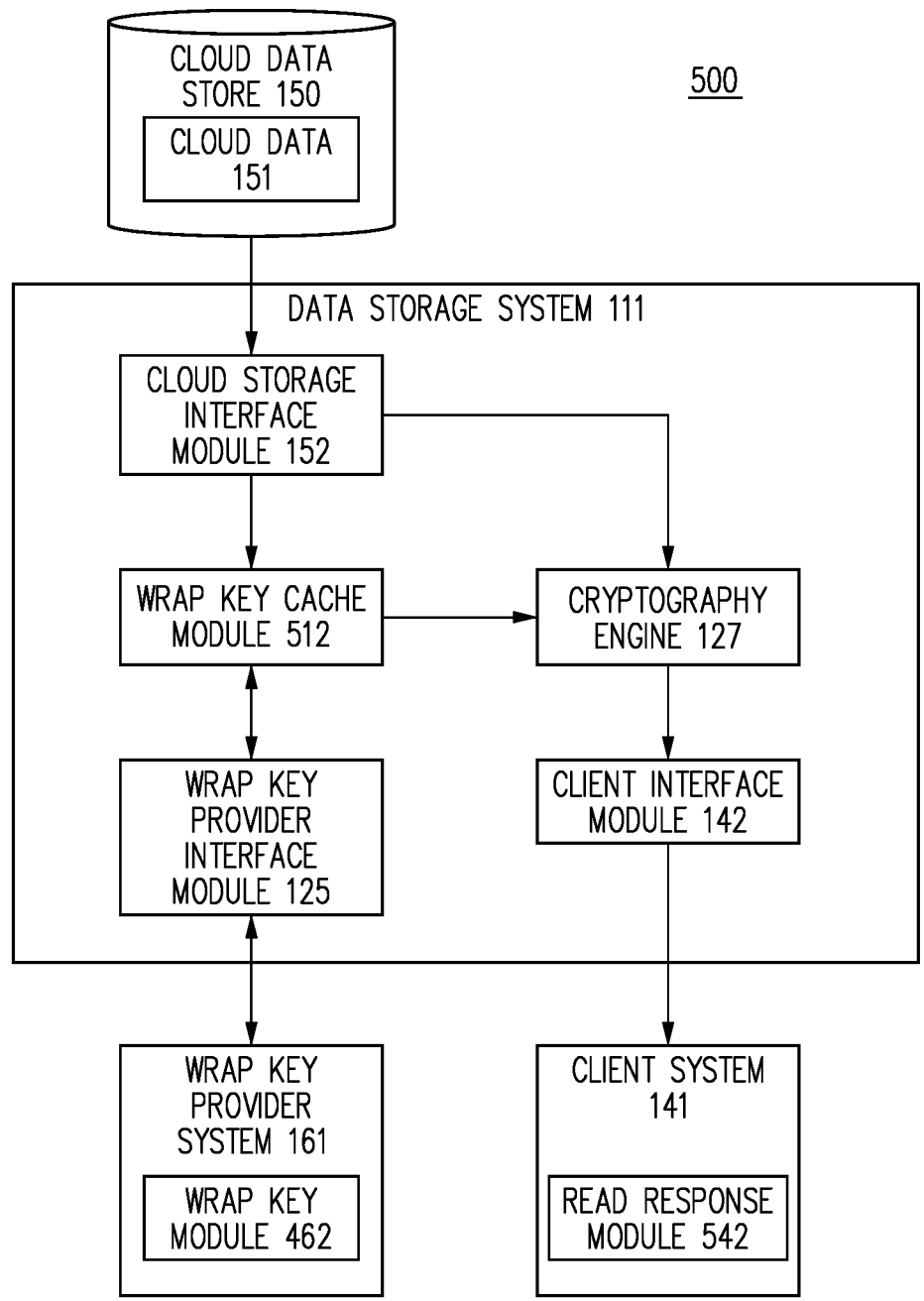
FIG. 5 is a functional block diagram of a process for encrypting data with hierarchical cryptographic key management, in accordance with various embodiments.

FIG. 5 is a functional block diagram of a process 500 for encrypting data with hierarchical cryptographic key management, in accordance with various embodiments. Referring to FIGS. 1, 2, 4, and 5 together, in some embodiments, a retrieval operation is performed by the data storage system 111 based on a read request from the client system 141. The cloud storage interface module 152 may receive the envelope 240 from the cloud data 151 of the cloud data store 150. In various embodiments, the envelope 240 includes the cypher wrap key 221, the cypher data key 224, and the cypher data particle 223. In some embodiments, the envelope 240 includes additional cryptography material. If the data storage system 111 includes a wrap key cache 131, then a wrap key cache module 512 determines whether a plain wrap key 201 that is associated with the cypher wrap key 221 is in the wrap key cache 131. If so, then the wrap key cache module 512 may provide the plain wrap key 201 to the cryptography engine 127. If not, then the wrap key provider interface module 125 may make a request to the wrap key module 462 of the wrap key provider system 161 for the applicable plain wrap key 201. Upon receipt of the plain wrap key 201 by the wrap key provider interface module 125, it is provided to the cryptography engine 127 and optionally added to the wrap key cache 131 by the wrap key cache module 512.

The cryptography engine 127 may use the plain wrap key 201 to decrypt the cypher data key 224 to form the plain data key 204. The cryptography engine 127 may use the plain data key 204 to decrypt the cypher data particle 223 to form the plain data particle 203. The client interface module 142 may then transmit the plain data particle 203 to a read response module 542 of the client system 141.

Figure 6:
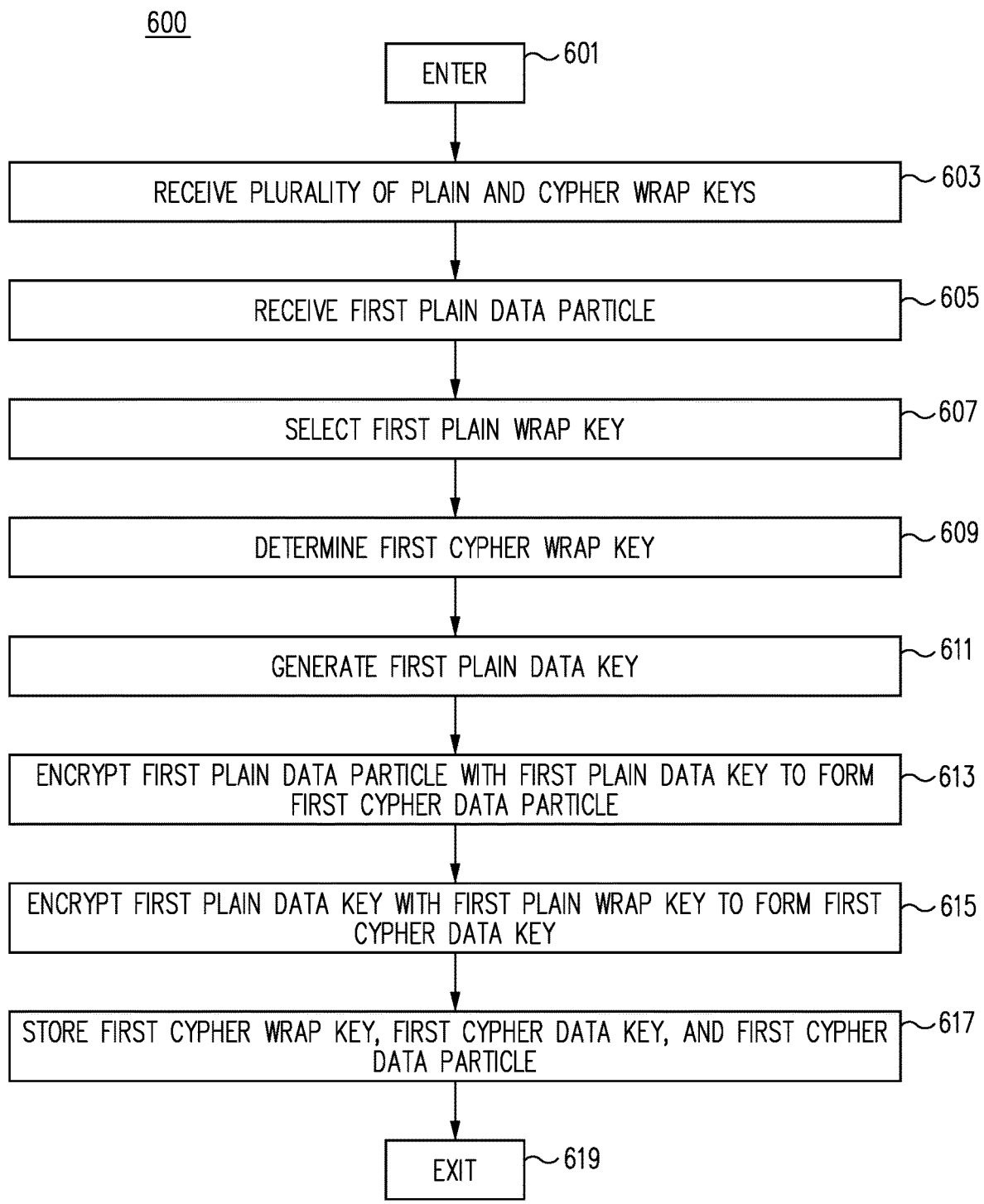
FIG. 6 is a flow diagram of a process for encrypting data with hierarchical cryptographic key management, in accordance with various embodiments.

FIG. 6 is a flow diagram of a process 600 for encrypting data with hierarchical cryptographic key management, in accordance with various embodiments.

Referring to FIGS. 1, 2, 4, 5, and 6 together, the process 600 for encrypting data with hierarchical cryptographic key management begins at ENTER OPERATION 601 and process flow proceeds to RECEIVE PLURALITY OF PLAIN AND CYPHER WRAP KEYS OPERATION 603.

In one embodiment, at RECEIVE PLURALITY OF PLAIN AND CYPHER WRAP KEYS OPERATION 603, a plurality of plain wrap keys 201 and a plurality of cypher wrap keys 221 are received from a wrap key provider system 161, in which each of the plurality of cypher wrap keys 221 is in an encrypted form of a respective one of the plurality of plain wrap keys 201. The wrap key provider system 161 may be a provider of keys that are generated based on a master key. For example, a wrap key provider system 161 can hold a master key that is, for example, identified with a master key identifier. A plain wrap key 201 can be generated by the wrap key provider system 161 that is an unencrypted key, and the plain wrap key 201 can be encrypted with the master key to form a cypher wrap key 221 that is an encrypted form of the plain wrap key 201. A wrap key module 462 of the wrap key provider system 161 may transmit a plain wrap key 201 and the associated cypher wrap key 221 to the wrap key provider interface module 125 of the data storage system 111.

Under various embodiments, the plurality of plain wrap keys 201 and the plurality of cypher wrap keys 221 are received by a wrap key provider interface module 125 that is configured to interface with the wrap key provider system 161 via a communication channel Under various embodiments, the data storage system 111 includes the cryptography data store 112 having the wrap key pool 121. The wrap key pool 121 may hold the plurality of plain wrap keys 201 and the plurality of cypher wrap keys 221, and the wrap key pool module 412 can manage the storage of keys in the wrap key pool 121. For example, when a plain wrap key 201 is to be selected from the wrap key pool 121, the wrap key pool module 412 can make that selection such as by randomly selecting a plain wrap key 201 from the wrap key pool module. Furthermore, after a plain wrap key 201 is selected, the associated metric 202 for the plain wrap key 201 can be updated to reflect the selection, such as incrementing a counter. For example, if a counter had a value of three before the associated plain wrap key 201 is selected, after selection the counter can be incremented to have a value of four.

It is to be understood that a metric 202 can be updated any time after a selection of a plain wrap key 201 is made. Furthermore, the wrap key pool module 412 can determine when a metric 202 exceeds a threshold that indicates that the plain wrap key 201 can be removed from the wrap key pool 121. For example, if a threshold value is ten, and a metric 202 has a value of ten prior to selection of the associated plain wrap key 201, then after the selection the metric 202 can be modified to be eleven, which exceeds the threshold value of ten. Accordingly, since a threshold value has been determined to be exceeded, the wrap key pool module 412 can remove the plain wrap key 201 and the associated cypher wrap key 221 from the wrap key pool 121, and can transmit a request for a new plain wrap key 201 and a new associated cypher wrap key 221 from the wrap key provider system 161 via the wrap key provider interface module 125.

Under some embodiments, each plain wrap key 201 of the plurality of plain wrap keys is received serially. For example, a first request from the wrap key pool module 412 can result in receipt of a first plain wrap key 201, and a second request from the wrap key pool module 412 can result in receipt of a second plain wrap key 201. Under some embodiments, each plain wrap key 201 is received after a request from the wrap key pool module 412 for a new plain wrap key 201. Under other embodiments, a plurality of wrap keys 201 can be received in parallel as a group of keys from the wrap key provider system 161.

In one embodiment, once a plurality of plain wrap keys 201 and a plurality of cypher wrap keys 221 are received at RECEIVE PLURALITY OF PLAIN AND CYPHER WRAP KEYS OPERATION 603, process flow proceeds to RECEIVE FIRST PLAIN DATA PARTICLE OPERATION 605.

In one embodiment, at RECEIVE FIRST PLAIN DATA PARTICLE OPERATION 605, a first plain data particle 203A may be received from the client system 141. Under various embodiments, the client system 141 may have a write request module 442 that transmits the first plain data particle 203A to the data storage system 111. The data storage system 111 may have a client interface module 142 to receive the first plain data particle 203A. Under some embodiments, the client interface module 142 may store the first plain data particle 203A in transient memory of the cryptography data store 112.

In one embodiment, once a first plain data particle 203A is received at RECEIVE FIRST PLAIN DATA PARTICLE OPERATION 605, process flow proceeds to SELECT FIRST PLAIN WRAP KEY OPERATION 607.

In one embodiment, at SELECT FIRST PLAIN WRAP KEY OPERATION 607, a first plain wrap key 201A is selected from the plurality of plain wrap keys. In various embodiments, the plurality of plain wrap keys is stored in the wrap key pool 121 and the first plain wrap key 201A is selected by the wrap key pool module 412. Under various embodiments, the selection of a first plain wrap key 201A is done as a random selection from the plurality of plain wrap keys stored in the wrap key pool 121.

In one embodiment, once a first plain wrap key 201A is selected at SELECT FIRST PLAIN WRAP KEY OPERATION 607, process flow proceeds to DETERMINE FIRST CYPHER WRAP KEY OPERATION 609.

In one embodiment, at DETERMINE FIRST CYPHER WRAP KEY OPERATION 609, a first cypher wrap key 221A is determined from the plurality of cypher wrap keys such that the first cypher wrap key 221A is associated with the first plain wrap key 201A. In various embodiments, the first cypher wrap key 221A is an encrypted form of the first plain wrap key 201A. In various embodiments, each cypher wrap key 221 of the plurality of cypher wrap keys are stored in the wrap key pool 121 in association with a respective plain wrap key 201 of the plurality of plain wrap keys. Under various embodiments, the wrap key pool module 412 determines the first cypher wrap key 221A that is associated with the respective first plain wrap key 201A. Under various embodiments, there is a one-to-one relationship between a plain wrap key 201 and a respective cypher wrap key 221.

In one embodiment, once a first cypher wrap key that is associated with the first plain wrap key 201A is determined from the plurality of cypher wrap keys at DETERMINE FIRST CYPHER WRAP KEY OPERATION 609, process flow proceeds to GENERATE FIRST PLAIN DATA KEY OPERATION 611.

In one embodiment, at GENERATE FIRST PLAIN DATA KEY OPERATION 611, a first plain data key 204A is generated. In some embodiments, the first plain data key 204A is generated by the data key generator 126 of the data storage system 111. Under various embodiments, there is a one-to-one relationship between each plain data key 204 and the respective plain data particle 203. Under various embodiments, a generated plain data key 204 is paired with a decrypted plain data particle 203.

In one embodiment, once a first plain data key 204A is generated at GENERATE FIRST PLAIN DATA KEY OPERATION 611, process flow proceeds to ENCRYPT FIRST PLAIN DATA PARTICLE WITH FIRST PLAIN DATA KEY TO FORM FIRST CYPHER DATA PARTICLE OPERATION 613.

In one embodiment, at ENCRYPT FIRST PLAIN DATA PARTICLE WITH FIRST PLAIN DATA KEY TO FORM FIRST CYPHER DATA PARTICLE OPERATION 613, the first plain data particle 203A is encrypted with the first plain data key 204A to form a first cypher data particle 223A. In some embodiments, the cryptography engine 127 performs the encryption of the first plain data particle 203A.

In one embodiment, once the first plain data particle 203A is encrypted with the first plain data key 204A to form a first cypher data particle 223A at ENCRYPT FIRST PLAIN DATA PARTICLE WITH FIRST PLAIN DATA KEY TO FORM FIRST CYPHER DATA PARTICLE OPERATION 613, process flow proceeds to ENCRYPT FIRST PLAIN DATA KEY WITH FIRST PLAIN WRAP KEY TO FORM FIRST CYPHER DATA KEY OPERATION 615.

In one embodiment, at ENCRYPT FIRST PLAIN DATA KEY WITH FIRST PLAIN WRAP KEY TO FORM FIRST CYPHER DATA KEY OPERATION 615, the first plain data key 204A is encrypted with the first plain wrap key 201A to form a first cypher data key 224A. In various embodiments, the cryptography engine 127 performs the encryption of the first plain data key 204A. In various embodiments, the cryptography engine 127 receives the first plain wrap key 201A from the wrap key pool module 412. In various embodiments, there is a one-to-many relationship between a plain wrap key 201 and a plurality of cypher data keys 224.

For example, under various embodiments, the data storage system 111 may receive a second plain data particle 203B from the client system 141. The wrap key pool module 412 can select from the plurality of plain wrap keys stored in the wrap key pool 121 the first plain wrap key 201A. In other words, the first plain wrap key 201A may be selected more than once, as it had already been selected at SELECT FIRST PLAIN WRAP KEY OPERATION 607. The wrap key pool module 412 can determine from the plurality of cypher wrap keys stored in the wrap key pool 121 the first cypher wrap key 221A that is associated with the first plain wrap key 201A. The data key generator 126 can generate a second plain data key 204B, which will have a one-to-one relationship with the second plain data particle 203B. The cryptography engine 127 can encrypt the second plain data particle 203B with the second plain data key 204B to form a second cypher data particle 223B. The cryptography engine 127 can encrypt the second plain data key 204B with the first plain wrap key 201A to form a second cypher data key 224B. Thereafter, the cloud storage interface module 152 can store in the cloud data store 150 the first cypher wrap key 221A, the second cypher data key 224B, and the second cypher data particle 223B. As is illustrated in this example, the first plain wrap key 201A can be used to encrypt the first plain data key 204A and the second plain data key 204B, illustrating the one-to many relationship between a plain wrap key 201 and respective one of a plurality of plain data keys 204.

In one embodiment, once the first plain data key 204A is encrypted with the first plain wrap key 201A to form the cypher data key 224A at ENCRYPT FIRST PLAIN DATA KEY WITH FIRST PLAIN WRAP KEY TO FORM FIRST CYPHER DATA KEY OPERATION 615, process flow proceeds to STORE FIRST CYPHER WRAP KEY, FIRST CYPHER DATA KEY, AND FIRST CYPHER DATA PARTICLE OPERATION 617.

In one embodiment, at STORE FIRST CYPHER WRAP KEY, FIRST CYPHER DATA KEY, AND FIRST CYPHER DATA PARTICLE OPERATION 617, the first cypher wrap key 221A, the first cypher data key 224A, and the first cypher data particle 223A is stored in the cloud data store 150. Under various embodiments, the cloud storage interface module 152 stores in the cloud data store 150 the first cypher wrap key 221A, the first cypher data key 224A, and the first cypher data particle 223A. Under various embodiments, an envelope 240 is formed from the first cypher wrap key 221A, the first cypher data key 224A, and the first cypher data particle 223A, and the envelope 240 is stored in the cloud data store 150. Under some embodiments, the first cypher wrap key 221A can be considered a wrapper of the envelope 240.

In one embodiment, once the first cypher wrap key 221A, the first cypher data key 224A, and the first cypher data particle 223A are stored in the cloud data store 150 at STORE FIRST CYPHER WRAP KEY, FIRST CYPHER DATA KEY, AND FIRST CYPHER DATA PARTICLE OPERATION 617, process flow proceeds to EXIT OPERATION 619.

In one embodiment, at EXIT OPERATION 619, process 600 for encrypting data with hierarchical cryptographic key management is exited.

In various embodiments, the process 600 illustrates ingesting data such as a plain data particle 203. In various embodiments, the first cypher wrap key 221A, the first cypher data key 224A, and the first cypher data particle 223A that is stored in the cloud data store 150 at STORE FIRST CYPHER WRAP KEY, FIRST CYPHER DATA KEY, AND FIRST CYPHER DATA PARTICLE OPERATION 617 can be retrieved. For example, after storing in the cloud data store 150 the first cypher wrap key 221A, the first cypher data key 224A, and the first cypher data particle 223A, then the first cypher wrap key 221A, the first cypher data key 224A, and the first cypher data particle 223A can be retrieved from the cloud data store 150 via the cloud storage interface module 152. In some embodiments, the first cypher wrap key 221A, the first cypher data key 224A, and the first cypher data particle 223A are retrieved as the envelope 240.

The wrap key provider interface module 125 of the data storage system 111 can transmit the first cypher wrap key 221A to the wrap key module 462 of the wrap key provider system 161. In various embodiments, the wrap key module 462 can decrypt a cypher wrap key 221 with a master key to form a plain wrap key 201 that is transmitted to the wrap key provider interface module 125. In various embodiments, a cypher wrap key 221 is compared and matched with a plurality of cypher wrap keys, and a respective plain wrap key 201 is selected and transmitted to the wrap key provider interface module 125.

In various embodiments, the first plain wrap key 201M is received by the wrap key provider interface module 125 from the wrap key module 462. In this illustration, the first plain wrap key 201A may correspond to the first plain wrap key 201M. In various embodiments, the first plain wrap key 201M is a decrypted form of the first cypher wrap key 221M. In this illustration, the first cypher wrap key 221A may correspond to the first cypher wrap key 221M. The cryptography engine 127 may decrypt the first cypher data key 224M with the first plain wrap key 201M to form the first plain data key 204A. The cryptography engine 127 may decrypt the first cypher data particle 223A with the first plain data key 204A to form the first plain data particle 203A. The first plain data particle 203A may be transmitted to the client system 141. In various embodiments, the first plain data particle 203A is transmitted by the client interface module 142 of the data storage system 111 to the read response module 542 of the client system 141.

In various embodiments, the first cypher wrap key 221M transmitted to the wrap key provider system 161 and the first plain wrap key 201M received from the wrap key provider system 161 can be stored in a wrap key cache 131. The wrap key cache 131 can, for example, temporarily store recently requested plain wrap keys 201, in order to reduce the number of network calls made to the wrap key provider system 161 to decrypt retrieved data. Each plain wrap key 201 and each associated cypher wrap key 221 in the wrap key cache 131 can be removed from the wrap key cache 131 after a determined time period elapses, such as twenty minutes.

In various embodiments, after storing the first cypher wrap key 221A, the first cypher data key 224A, and the first cypher data particle 223A at STORE FIRST CYPHER WRAP KEY, FIRST CYPHER DATA KEY, AND FIRST CYPHER DATA PARTICLE OPERATION 617, the first cypher wrap key 221A, the first cypher data key 224A, and the first cypher data particle 223A can be retrieved from the cloud data store 150. The wrap key cache module 512 can determine that the first cypher wrap key 221A is not held by the wrap key cache 131, and thus, a request can be transmitted to the wrap key provider system 161 for receipt of the associated first plain wrap key 201A.

Alternatively, the wrap key cache module 512 can determine that the first cypher wrap key 221A is held by the wrap key cache 131 as a first cypher wrap key 221M. For example, the wrap key cache module 512 can include a second plurality of plain wrap keys and a second plurality of cypher wrap keys, and each of the second plurality of cypher wrap keys is an encrypted form of a respective one of the second plurality of plain wrap keys. The wrap key cache module 512 can determine that the first cypher wrap key 221M is a member of the second plurality of cypher wrap keys of the wrap key cache 131. The wrap key cache module 512 can retrieve the first plain wrap key 201M that is associated with the first cypher wrap key 221M in the wrap key cache 131. In various embodiments, the first plain wrap key 201M is a decrypted form of the first cypher wrap key 221M. The cryptography engine 127 can decrypt the first cypher data key 224A with the first plain wrap key 201M to form the first plain data key 204A. The cryptography engine 127 can then decrypt the first cypher data particle 223A with the first plain data key 204A to form the first plain data particle 203A. The client interface module 142 can transmit the first plain data particle 203A to the read response module 542 of the client system 141.

Figure 7:
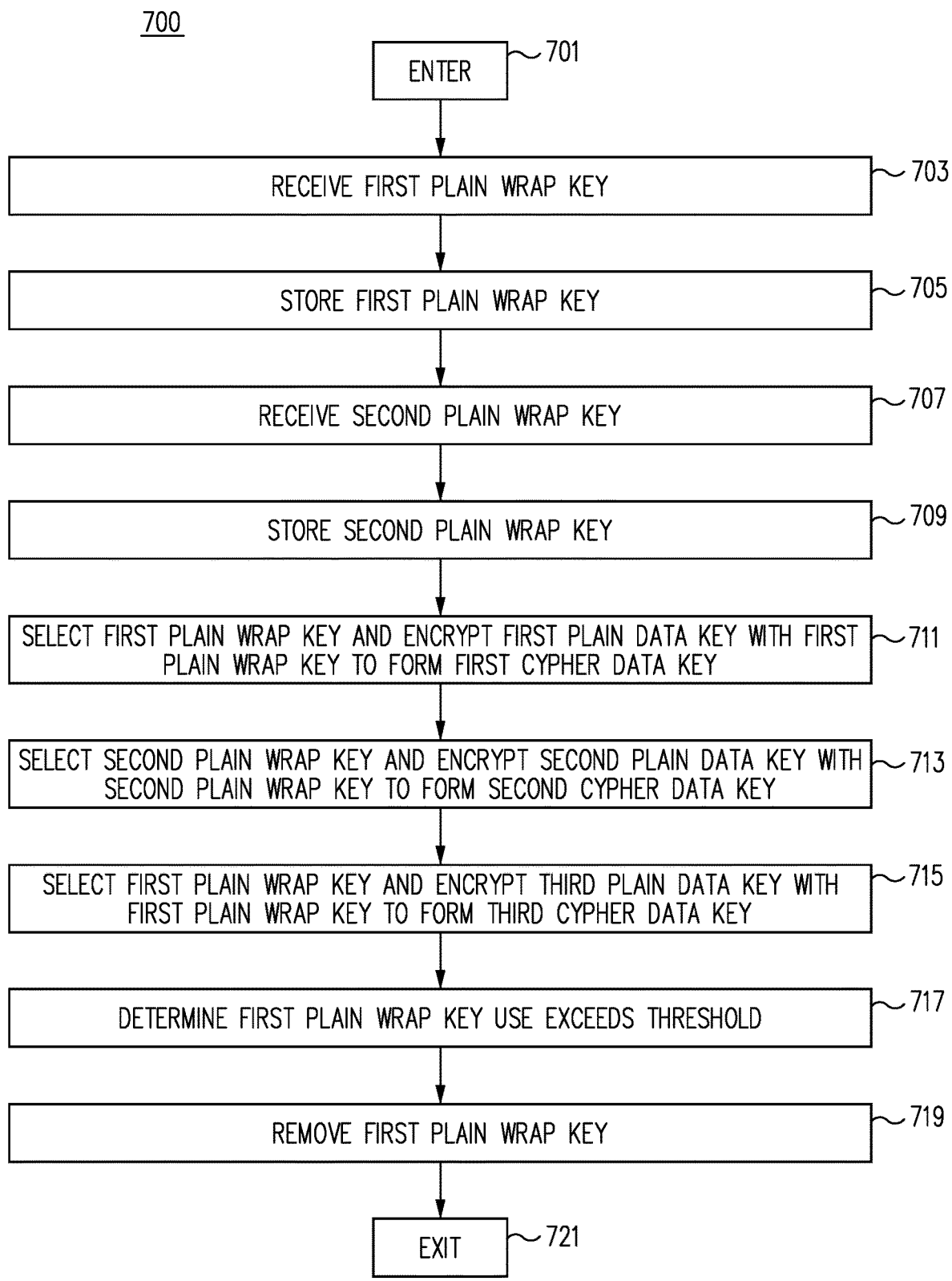
FIG. 7 is a flow diagram of a process for encrypting data with hierarchical cryptographic key management, in accordance with various embodiments.

FIG. 7 is a flow diagram of a process 700 for encrypting data with hierarchical cryptographic key management, in accordance with various embodiments.

Referring to FIGS. 1, 2, 4, and 7 together, the process 700 for encrypting data with hierarchical cryptographic key management begins at ENTER OPERATION 701 and process flow proceeds to RECEIVE FIRST PLAIN WRAP KEY OPERATION 703.

In one embodiment, at RECEIVE FIRST PLAIN WRAP KEY OPERATION 703, a first plain wrap key 201A is received. In some embodiments, the first plain wrap key 201A is received by the wrap key provider interface module 125. In various embodiments, a first cypher wrap key 221A associated with the first plain wrap key 201A is also received by the wrap key provider interface module 125.

In one embodiment, once the first plain wrap key 201A is received at RECEIVE FIRST PLAIN WRAP KEY OPERATION 703, process flow proceeds to STORE FIRST PLAIN WRAP KEY OPERATION 705.

In one embodiment, at STORE FIRST PLAIN WRAP KEY OPERATION 705, the first plain wrap key 201A is stored in the wrap key pool 121. In various embodiments, the first plain wrap key 201A is stored in the wrap key pool 121 by the wrap key pool module 412. In various embodiments, the first cypher wrap key 221A is also stored in the wrap key pool 121 by the wrap key pool module 412.

In one embodiment, once the first plain wrap key 201A is stored in the wrap key pool 121 at STORE FIRST PLAIN WRAP KEY OPERATION 705, process flow proceeds to RECEIVE SECOND PLAIN WRAP KEY OPERATION 707.

In one embodiment, at RECEIVE SECOND PLAIN WRAP KEY OPERATION 707, a second plain wrap key 201B is received. In various embodiments, the second plain wrap key 201B is received by the wrap key provider interface module 125. In various embodiments, a second cypher wrap key 221B associated with the second plain wrap key 201B is also received by the wrap key provider interface module 125.

In one embodiment, once the second plain wrap key 201B is received at RECEIVE SECOND PLAIN WRAP KEY OPERATION 707, process flow proceeds to STORE SECOND PLAIN WRAP KEY OPERATION 709.

In one embodiment, at STORE SECOND PLAIN WRAP KEY OPERATION 709, the second plain wrap key 201B is stored in the wrap key pool 121. In various embodiments, the second plain wrap key 201B is stored in the wrap key pool 121 by the wrap key pool module 412. In various embodiments, the second cypher wrap key 221B is also stored in the wrap key pool 121 by the wrap key pool module 412.

In one embodiment, once the second plain wrap key 201B is stored in the wrap key pool 121 at STORE SECOND PLAIN WRAP KEY OPERATION 709, process flow proceeds to SELECT FIRST PLAIN WRAP KEY AND ENCRYPT FIRST PLAIN DATA KEY WITH FIRST PLAIN WRAP KEY TO FORM FIRST CYPHER DATA KEY OPERATION 711.

In one embodiment, at SELECT FIRST PLAIN WRAP KEY AND ENCRYPT FIRST PLAIN DATA KEY WITH FIRST PLAIN WRAP KEY TO FORM FIRST CYPHER DATA KEY OPERATION 711, the first plain wrap key 201A is selected from the wrap key pool 121 and a first plain data key 204A is encrypted with the first plain wrap key 201A to form a first cypher data key 224A. In various embodiments, the selection of the first plain wrap key 201A is a random selection. In various embodiments, the first plain data key 204A is used by the cryptography engine 127 to encrypt a first plain data particle 203A to form a first cypher data particle 223A. In various embodiments, the cloud storage interface module 152 stores the first cypher wrap key 221A, the first cypher data key 224A, and the first cypher data particle 223A as a first envelope 240A in the cloud data store 150.

In one embodiment, once the first plain wrap key 201A is selected from the wrap key pool 121 and the first plain data key 204A is encrypted with the first plain wrap key 201A to form the first cypher data key 224A at SELECT FIRST PLAIN WRAP KEY AND ENCRYPT FIRST PLAIN DATA KEY WITH FIRST PLAIN WRAP KEY TO FORM FIRST CYPHER DATA KEY OPERATION 711, the process flow proceeds to SELECT SECOND PLAIN WRAP KEY AND ENCRYPT SECOND PLAIN DATA KEY WITH SECOND PLAIN WRAP KEY TO FORM SECOND CYPHER DATA KEY OPERATION 713.

In one embodiment, at SELECT SECOND PLAIN WRAP KEY AND ENCRYPT SECOND PLAIN DATA KEY WITH SECOND PLAIN WRAP KEY TO FORM SECOND CYPHER DATA KEY OPERATION 713, the second plain wrap key 201B is selected from the wrap key pool 121 and a second plain data key 204B is encrypted with the second plain wrap key 201B to form a second cypher data key 224B. In various embodiments, the selection of the second plain wrap key 201B is a random selection. In various embodiments, the second plain data key 204B is used by the cryptography engine 127 to encrypt a second plain data particle 203B to form a second cypher data particle 223B. In various embodiments, the cloud storage interface module 152 stores the second cypher wrap key 221B, the second cypher data key 224B, and the second cypher data particle 223B as a second envelope 240B in the cloud data store 150.

In one embodiment, once the second plain wrap key 201B is selected from the wrap key pool 121 and the second plain data key 204B is encrypted with the second plain wrap key 201B to form the second cypher data key 224B at SELECT SECOND PLAIN WRAP KEY AND ENCRYPT SECOND PLAIN DATA KEY WITH SECOND PLAIN WRAP KEY TO FORM SECOND CYPHER DATA KEY OPERATION 713, the process flow proceeds to SELECT FIRST PLAIN WRAP KEY AND ENCRYPT THIRD PLAIN DATA KEY WITH FIRST PLAIN WRAP KEY TO FORM THIRD CYPHER DATA KEY OPERATION 715.

In one embodiment, at SELECT FIRST PLAIN WRAP KEY AND ENCRYPT THIRD PLAIN DATA KEY WITH FIRST PLAIN WRAP KEY TO FORM THIRD CYPHER DATA KEY OPERATION 715, the first plain wrap key 201A is selected from the wrap key pool 121 and a third plain data key 204C is encrypted with the first plain wrap key 201A to form a third cypher data key 224C. In various embodiments, the selection of the first plain wrap key 201A is a random selection. In various embodiments, the third plain data key 204C is used by the cryptography engine 127 to encrypt a third plain data particle 203C to form a third cypher data particle 223C. In various embodiments, the cloud storage interface module 152 stores the first cypher wrap key 221A, the third cypher data key 224C, and the third cypher data particle 223C as a third envelope 240C in the cloud data store 150. As illustrated by process 700, the first plain wrap key 201A has a one-to-many relationship to the first plain data key 204A and the third plain data key 204C.

In one embodiment, once the first plain wrap key 201A is selected from the wrap key pool 121 and the third plain data key 204C is encrypted with the first plain wrap key 201A to form the third cypher data key 224C at SELECT FIRST PLAIN WRAP KEY AND ENCRYPT THIRD PLAIN DATA KEY WITH FIRST PLAIN WRAP KEY TO FORM THIRD CYPHER DATA KEY OPERATION 715, process flow proceeds to DETERMINE FIRST PLAIN WRAP KEY USE EXCEEDS THRESHOLD OPERATION 717.

In one embodiment, at DETERMINE FIRST PLAIN WRAP KEY USE EXCEEDS THRESHOLD OPERATION 717, the first plain wrap key 201A is determined to have exceeded a use associated with a threshold of use for encryption. In various embodiments, the determination is made by the wrap key pool module 412 and a first metric 202A measures the use of the first plain wrap key. In various embodiments, the first metric 202A can determine the availability or unavailability of the first plain wrap key 201 for encryption of a plain data key. In various embodiments, the first metric 202A is a counter that is incremented or modified for each selection of the first plain wrap key 201A by the wrap key pool module 412. In various embodiments, the threshold of use for encryption is based on an incremental count of a use of the first plain wrap key 201 for encryption In one embodiment, once the first plain wrap key 201A is determined to have exceeded a use associated with a threshold of use for encryption at DETERMINE FIRST PLAIN WRAP KEY USE EXCEEDS THRESHOLD OPERATION 717, process flow proceeds to REMOVE FIRST PLAIN WRAP KEY OPERATION 719.

In one embodiment, at REMOVE FIRST PLAIN WRAP KEY OPERATION 719, the first plain wrap key 201A is removed from the wrap key pool 121. In various embodiments, the first plain wrap key 201A is stored in volatile memory and the wrap key pool module 412 removes the first plain wrap key 201A from the wrap key pool 121 by erasing the first plain wrap key 201A from the volatile memory.

In one embodiment, once the first plain wrap key 201A is removed from the wrap key pool 121 at REMOVE FIRST PLAIN WRAP KEY OPERATION 719, process flow proceeds to EXIT OPERATION 721.

In one embodiment, at EXIT OPERATION 721, process 700 for encrypting data with hierarchical cryptographic key management is exited.

In various embodiments, after the first plain wrap key 201A is removed from the wrap key pool 121 at REMOVE FIRST PLAIN WRAP KEY OPERATION 719, a third plain wrap key 201C is received by the wrap key provider interface module 125 from the wrap key provider system 161. The wrap key pool module 412 can store the third plain wrap key 201C in the wrap key pool 121. In some embodiments, the wrap key provider interface module 125 also receives a third cypher wrap key 221C from the key provider system 161 and the wrap key pool module 412 stores the third cypher wrap key 221C in the wrap key pool 121. The wrap key pool module 412 can select the third plain wrap key 201C from the wrap key pool 121 and the cryptographic engine 127 can encrypt a fourth plain data key 204D with the third plain wrap key 201C to form a fourth cypher data key 224D.

In various embodiments, the wrap key pool module 412 can determine that the second plain wrap key 201B has exceeded a use associated with the threshold for encryption. In various embodiments, a second metric 202B measures the use of the second plain wrap key 201B and a determination is made by the wrap key pool module 412 as to whether its use has exceeded a determined threshold. In various embodiments, the second metric 202B is a counter that is incremented for each selection of the second plain wrap key 201B by the wrap key pool module 412. The second plain wrap key 201B can be removed from the wrap key pool 121 by the wrap key pool module 412. In some embodiments, a second cypher wrap key 221B is also removed from the wrap key pool 121 by the wrap key pool module 412. The wrap key provider interface module 125 can receive a fourth plain wrap key 201D from the wrap key module 462 of the wrap key provider system 161. The fourth plain wrap key 201D can be stored by the wrap key pool module 412 in the wrap key pool 121. The wrap key pool module 412 can select from the wrap key pool 121 the fourth plain wrap key 201D and encrypt a fifth plain data key 204E with the fourth plain wrap key 201D to form a fifth cypher data key 224E. In various embodiments, a fourth cypher wrap key 221D that is associated with the fourth cypher wrap key 221D is received by the wrap key provider interface module 125 and is stored in the key pool 121 by the wrap key pool module 412.

Rekeying Process

Figure 8:
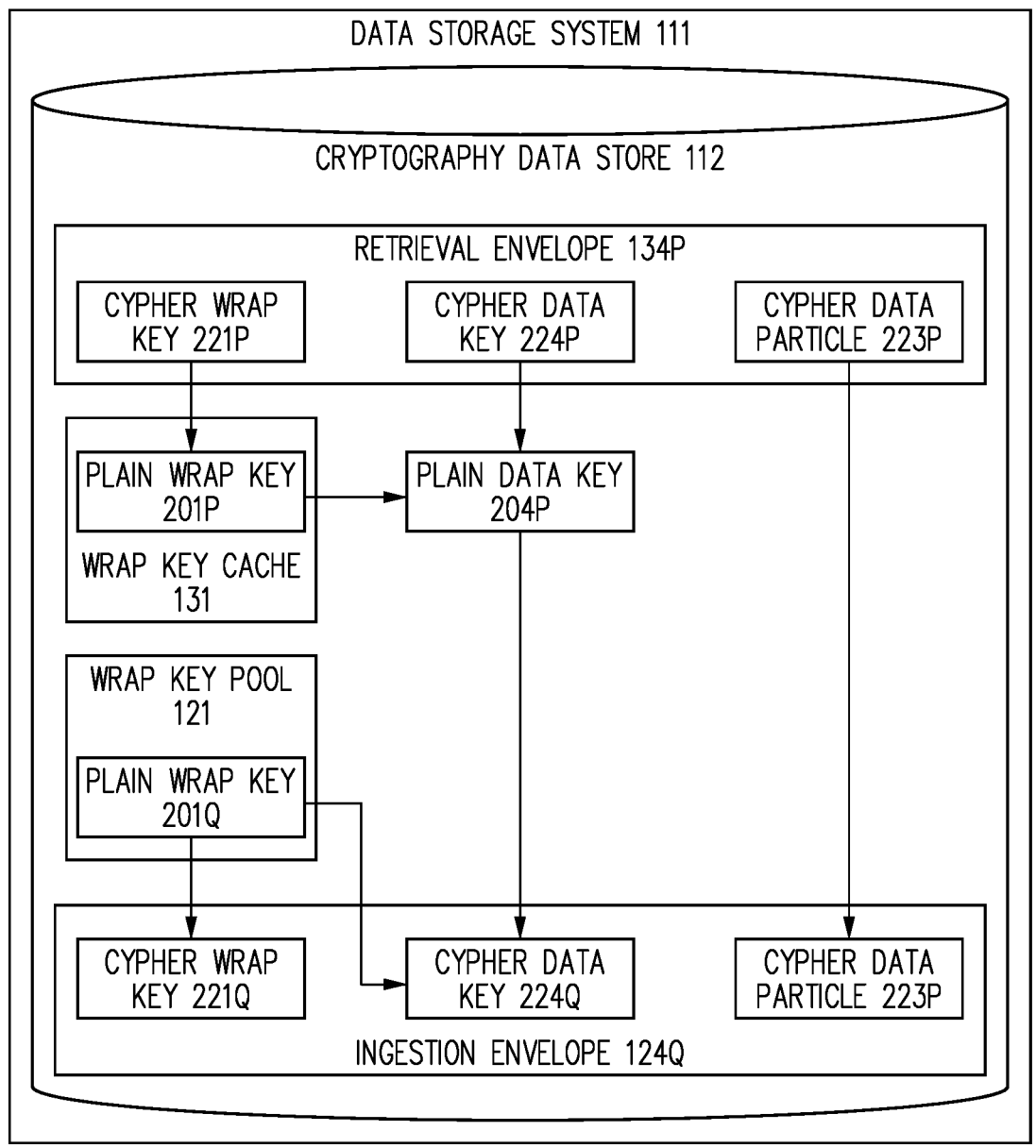
FIG. 8 is a data block diagram of a process for re-encryption with hierarchical cryptographic key management, in accordance with various embodiments.

FIG. 8 is a data block diagram of a process 800 for re-encryption with hierarchical cryptographic key management, in accordance with various embodiments. Referring to FIGS. 1, 2, 3, and 8 together, the data storage system 111 receives a retrieval envelope 134P, for example, the retrieval envelope 134P may be received from the cloud data store 150. The retrieval envelope 134P includes the first cypher wrap key 221P, the first cypher data key 224P, and the cypher data particle 223P. The data storage system 111 may store the first cypher wrap key 221P, the first cypher data key 224P, and the cypher data particle 223P in persistent storage of the cryptography data store 112.

In some embodiments, the wrap key cache 131 of the cryptography data store 112 includes a plurality of wrap keys in the form of a plain wrap key 201, which may be stored in volatile memory of the cryptography data store 112, and an associated cypher wrap key 221, which may be stored in persistent storage of the cryptography data store 112. As depicted in FIG. 3, the wrap key cache 131 can hold a plurality of plain wrap keys such as a plain wrap key 201C, a plain wrap key 201D, a plain wrap key 201M, and so on. As further depicted in FIG. 3, the wrap key cache 131 can hold a plurality of associated cypher wrap keys such as a cypher wrap key 221C, a cypher wrap key 221D, a cypher wrap key 221M, and so on. If the first cypher wrap key 221P is stored in the wrap key cache 131, then the associated first plain wrap key 201P is utilized to decrypt the first cypher data key 224P to form the plain data key 204P.

Alternatively, if the first cypher wrap key 221P is not within the wrap key cache 131, then the data storage system 111 can make a request to the wrap key provider system 161 for the first plain wrap key 201P that is associated with the first cypher wrap key 221P. It is to be understood that the wrap key cache 131 is an optimization to the process 800 and may be omitted. With such an omission, a search of the wrap key cache 131 for a first plain wrap key 201P is omitted and a request for the first plain wrap key 201P is transmitted to the wrap key provider system 161 including the first cypher wrap key 221P as an identifier to identify the first plain wrap key 201P to be returned.

In some embodiments, the request includes authentication and/or authorization of the data storage system 111 to make the request to the wrap key provider system 161. In some embodiments, the first cypher wrap key 221P serves to identify the first plain wrap key 201P that is to be returned. In other embodiments, an identifier of the first plain wrap key 201P serves to identify the first plain wrap key 201P that is to be returned. In some embodiments, a master key is utilized by the wrap key provider system 161 to decrypt the first cypher wrap key 221P to form the first plain wrap key 201P. In some embodiments, after the first plain wrap key 201P is determined, it is transmitted to the data storage system 111. Upon receipt of the first plain wrap key 201P, it may be stored in the wrap key cache 131. In some embodiments, an associated first cypher wrap key 221P is received and stored in the wrap key cache 131. A first plain wrap key 201P and its associated first cypher wrap key 221P may be stored in the wrap key cache 131 for a determined period, for example for five minutes to ten minutes or some other length of time that allows it to be used more than once without making another network call to the wrap key provider system 161. In some embodiments, a certain number of last recently used wrap keys may be stored in the wrap key cache 131. In some embodiments, a certain number of least recently used wrap keys may be removed from the wrap key cache 131.

The data storage system 111 may use the first plain wrap key 201P that is associated with the first cypher wrap key 221P to decrypt the first cypher data key 224P to form the plain data key 204P. The plain data key 204P may be stored in volatile memory of the cryptography data store 112.

The data storage system 111 may maintain a wrap key pool 121 within the cryptography data store 112. The wrap key pool 121 may be repeatedly replenished with new wrap keys from the wrap key provider system 161. Upon a request from the data storage system 111, the wrap key provider system 161 generates a plain wrap key 201 and encrypts it into a cypher wrap key 221. As depicted in FIG. 2, the wrap key pool 121 can hold a plurality of plain wrap keys such as a plain wrap key 201A, a plain wrap key 201B, a plain wrap key 201N, and so on. As further depicted in FIG. 2, the wrap key pool 121 can hold a plurality of associated cypher wrap keys such as a cypher wrap key 221A, a cypher wrap key 221B, a cypher wrap key 221N, and so on. The plain wrap key 201 and the cypher wrap key 221 may be transmitted to the data storage system 111 as a double tuple, which may be stored in the wrap key pool 121. Under some embodiments, the wrap key pool 121 can store a determined number of wrap keys, and in other embodiments, the number of wrap keys in the wrap key pool 121 may change based on the volume of plain data keys 204 to be re-encrypted. For example, a concurrent mechanism, such as a queue, can monitor the size of the wrap key pool 121 and if more wrap keys are required, additional wrap keys can be received from the wrap key provider system 161. If there are not enough wrap keys in the wrap key pool 121, an error state can be generated. The plain wrap key 201 may be stored in volatile memory of the cryptography data store 112 and the cypher wrap key 221 may be stored in persistent storage of the cryptography data store 112.

The plain data key 204P may be re-encrypted with a second plain wrap key 201Q to form a second cypher data key 224Q, which may be stored in persistent memory. After re-encryption of the plain data key 204P, it may be erased from the volatile memory of the cryptography data store 112.

Under some embodiments, the wrap key pool 121 may include a plurality of metrics 202, and each metric 202 may be associated with a respective plain wrap key 201. As depicted in FIG. 2, the wrap key pool 121 can hold a plurality of metrics such as a metric 202A, a metric 202B, a metric 202N, and so on. After encryption of the plain data key 204P, a metric 202 associated with the second plain wrap key 201Q may be modified to reflect the use of the second plain wrap key 201Q. For example, if the metric 202 is a counter, it is incremented by one count. If the metric 202 exceeds a threshold value, the associated plain wrap key 201 and the associated cypher wrap key 221 are erased, and a new plain wrap key 201 and a new cypher wrap key 221 is requested from the wrap key provider system 161 to be placed in the wrap key pool 121.

The data storage system 111 associates the cypher data particle 223P with the second cypher data key 224Q and associates the second cypher data key 224Q with the second cypher wrap key 221Q, and stores the second cypher wrap key 221Q, the second cypher data key 224Q, and the cypher data particle 223P as an ingestion envelope 124Q to be stored at the cloud data store 150. It is to be understood that the ingestion envelope 124Q may include other cryptographic material such as one or more initialization vectors, an identifier of the second cypher wrap key 221Q, and the like.

Figure 9:
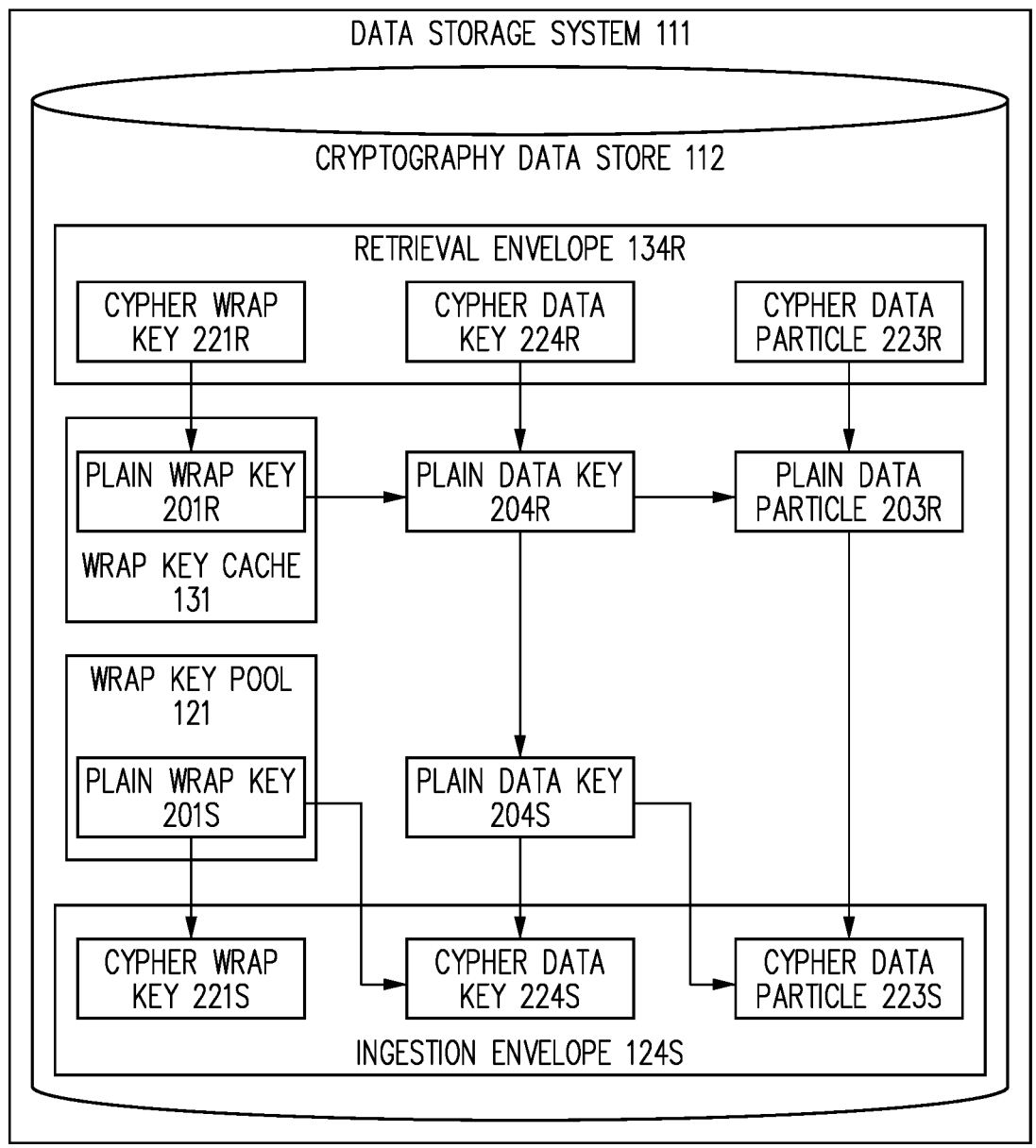
FIG. 9 is a data block diagram of a process for re-encryption with hierarchical cryptographic key management, in accordance with various embodiments.

FIG. 9 is a data block diagram of a process 900 for re-encryption with hierarchical cryptographic key management, in accordance with various embodiments. Referring to FIGS. 1, 2, 3, and 9 together, the data storage system 111 receives a retrieval envelope 134R, for example, the retrieval envelope 134R may be received from the cloud data store 150. The retrieval envelope 134R includes the first cypher wrap key 221R, the first cypher data key 224R, and the first cypher data particle 223R. The data storage system 111 may store the first cypher wrap key 221R, the first cypher data key 224R, and the first cypher data particle 223R in persistent storage of the cryptography data store 112.

In some embodiments, the wrap key cache 131 of the cryptography data store 112 includes a plurality of wrap keys in the form of a plain wrap key 201, which may be stored in volatile memory of the cryptography data store 112, and an associated cypher wrap key 221, which may be stored in persistent storage of the cryptography data store 112. As depicted in FIG. 3, the wrap key cache 131 can hold a plurality of plain wrap keys such as a plain wrap key 201C, a plain wrap key 201D, a plain wrap key 201M, and so on. As further depicted in FIG. 3, the wrap key cache 131 can hold a plurality of associated cypher wrap keys such as a cypher wrap key 221C, a cypher wrap key 221D, a cypher wrap key 221M, and so on. If the first cypher wrap key 221R is stored in the wrap key cache 131, then the associated first plain wrap key 201R is utilized to decrypt the first cypher data key 224R to form the first plain data key 204R.

Alternatively, if the first cypher wrap key 221R is not within the wrap key cache 131, then the data storage system 111 can make a request to the wrap key provider system 161 for the first plain wrap key 201R that is associated with the first cypher wrap key 221R. It is to be understood that the wrap key cache 131 is an optimization to the process 900 and may be omitted. With such an omission, a search of the wrap key cache 131 for a first plain wrap key 201R is omitted and a request for the first plain wrap key 201R is transmitted to the wrap key provider system 161 including the first cypher wrap key 221R as an identifier to identify the first plain wrap key 201R to be returned.

In some embodiments, the request includes authentication and/or authorization of the data storage system 111 to make the request to the wrap key provider system 161. In some embodiments, the first cypher wrap key 221R serves to identify the first plain wrap key 201R that is to be returned. In other embodiments, an identifier of the first plain wrap key 201R serves to identify the first plain wrap key 201R that is to be returned. In some embodiments, a master key is utilized by the wrap key provider system 161 to decrypt the first cypher wrap key 221R to form the first plain wrap key 201R. In some embodiments, after the first plain wrap key 201R is determined, it is transmitted to the data storage system 111. Upon receipt of the first plain wrap key 201R, it may be stored in the wrap key cache 131. In some embodiments, an associated first cypher wrap key 221R is received and stored in the wrap key cache 131. A first plain wrap key 201R and its associated first cypher wrap key 221R may be stored in the wrap key cache 131 for a determined period, for example for five minutes to ten minutes or some other length of time that allows it to be used more than once without making another network call to the wrap key provider system 161. In some embodiments, a certain number of last recently used wrap keys may be stored in the wrap key cache 131. In some embodiments, a certain number of least recently used wrap keys may be removed from the wrap key cache 131.

The data storage system 111 may use the first plain wrap key 201R that is associated with the first cypher wrap key 221R to decrypt the first cypher data key 224R to form the first plain data key 204R. The first plain data key 204R may be stored in volatile memory of the cryptography data store 112. The data storage system 111 may use the first plain data key 204R to decrypt the first cypher data particle 223R to form the plain data particle 203R. The plain data particle 203R may be stored in volatile memory of the cryptography data store 112.

The data storage system 111 may maintain a wrap key pool 121 within the cryptography data store 112. The wrap key pool 121 may be repeatedly replenished with new wrap keys from the wrap key provider system 161. Upon a request from the data storage system 111, the wrap key provider system 161 generates a plain wrap key 201 and encrypts it into a cypher wrap key 221. As depicted in FIG. 2, the wrap key pool 121 can hold a plurality of plain wrap keys such as a plain wrap key 201A, a plain wrap key 201B, a plain wrap key 201N, and so on. As further depicted in FIG. 2, the wrap key pool 121 can hold a plurality of associated cypher wrap keys such as a cypher wrap key 221A, a cypher wrap key 221B, a cypher wrap key 221N, and so on. The plain wrap key 201 and the cypher wrap key 221 may be transmitted to the data storage system 111 as a double tuple, which may be stored in the wrap key pool 121. Under some embodiments, the wrap key pool 121 can store a determined number of wrap keys, and in other embodiments, the number of wrap keys in the wrap key pool 121 may change based on the volume of plain data keys 204 to be re-encrypted. For example, a concurrent mechanism, such as a queue, can monitor the size of the wrap key pool 121 and if more wrap keys are required, additional wrap keys can be received from the wrap key provider system 161. If there are not enough wrap keys in the wrap key pool 121, an error state can be generated. The plain wrap key 201 may be stored in volatile memory of the cryptography data store 112 and the cypher wrap key 221 may be stored in persistent storage of the cryptography data store 112.

The data storage system 111 may generate a second plain data key 204S, which may be stored in volatile memory of the cryptography data store 112. The data storage system 111 may re-encrypt the plain data particle 203R using the second plain data key 204S to form a second cypher data particle 223S, which may be stored in persistent storage of the cryptography data store 112. After re-encryption of the plain data particle 203R, it may be erased from the volatile memory of the cryptography data store 112. After re-encryption of the plain data particle 203R, the second plain data key 204S may be encrypted with a second plain wrap key 201S to form a second cypher data key 224S, which may be stored in persistent memory. After encryption of the second plain data key 204S, it may be erased from the volatile memory of the cryptography data store 112.

Under some embodiments, the wrap key pool 121 may include a plurality of metrics 202, and each metric 202 may be associated with a respective plain wrap key 201. As depicted in FIG. 2, the wrap key pool 121 can hold a plurality of metrics such as a metric 202A, a metric 202B, a metric 202N, and so on. After encryption of the second plain data key 204S, a metric 202 associated with the second plain wrap key 201S may be modified to reflect the use of the second plain wrap key 201S. For example, if the metric 202 is a counter, it is incremented by one count. If the metric 202 exceeds a threshold value, the associated plain wrap key 201 and the associated cypher wrap key 221 are erased, and a new plain wrap key 201 and a new cypher wrap key 221 is requested from the wrap key provider system 161 to be placed in the wrap key pool 121.

The data storage system 111 associates the second cypher data particle 223S with the second cypher data key 224S and associates the second cypher data key 224S with the second cypher wrap key 221S, and stores the second cypher wrap key 221S, the second cypher data key 224S, and the second cypher data particle 223S as an ingestion envelope 124S to be stored at the cloud data store 150. It is to be understood that the ingestion envelope 124S may include other cryptographic material such as one or more initialization vectors, an identifier of the second cypher wrap key 221S, and the like.

Figure 10:
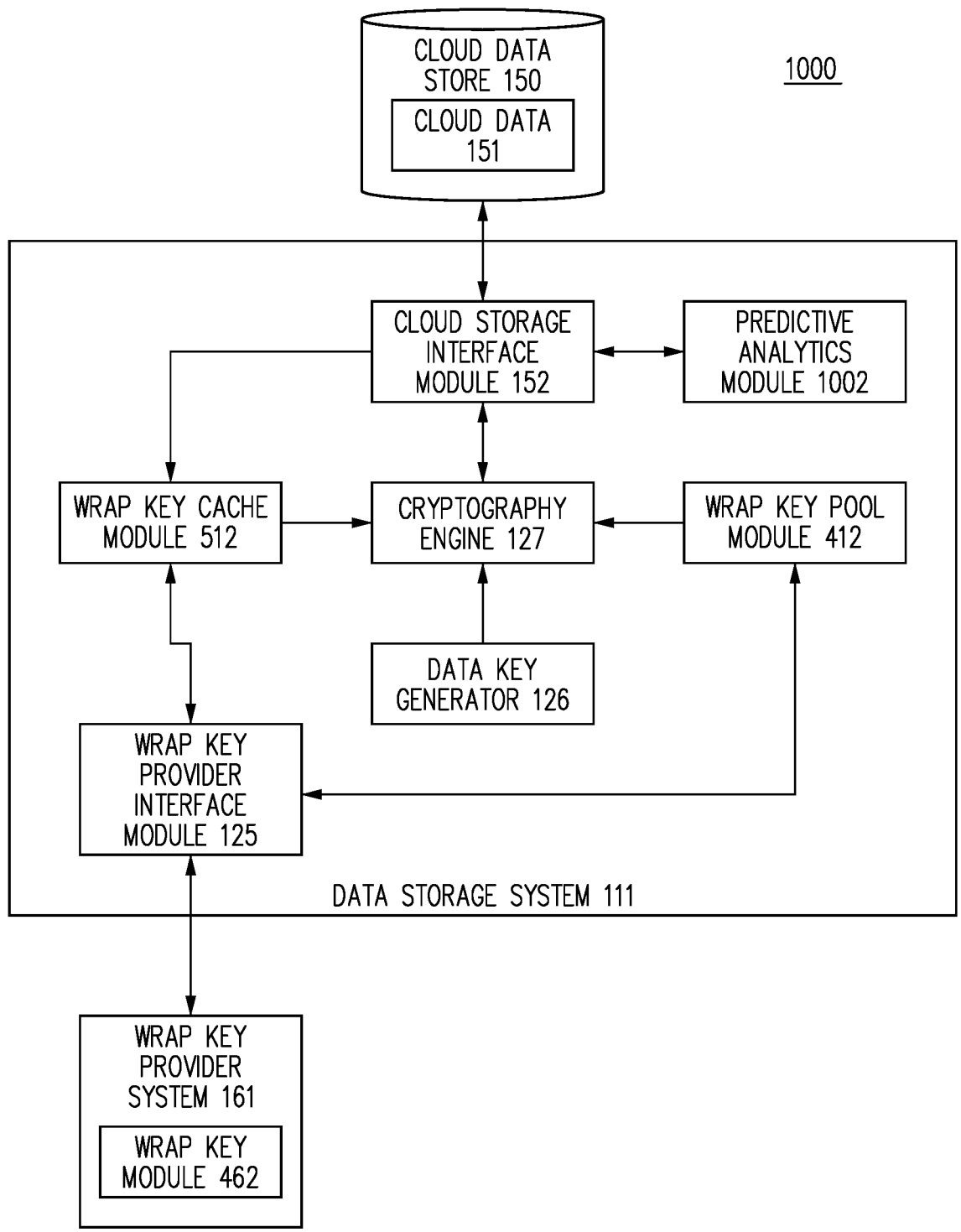
FIG. 10 is a functional block diagram of a process for re-encryption with hierarchical cryptographic key management, in accordance with various embodiments.

FIG. 10 is a functional block diagram of a process 1000 for re-encryption with hierarchical cryptographic key management, in accordance with various embodiments. Referring to FIGS. 1, 2, 8, 9, and 10 together, in some embodiments, a retrieval operation is performed by the data storage system 111 based on a re-encryption request. The cloud storage interface module 152 may receive the retrieval envelope 134P from the cloud data 151 of the cloud data store 150. In various embodiments, the retrieval envelope 134P includes the first cypher wrap key 221P, the first cypher data key 224P, and the cypher data particle 223P. In some embodiments, the retrieval envelope 134P includes additional cryptography material.

In some embodiments, envelopes are selected to be re-encrypted based on rekeying or key rotation. For example, a key may be rotated based on a time interval since a prior encryption. Under this example, meta-information about a wrap key can be stored with the wrap key, such as creation date, encryption date, number of uses, and the like, in order to determine when a wrap key is to be rotated or changed. For those envelopes that have the selected wrap keys as a key wrapper, such envelopes may be selected by the cloud storage interface module 152 for rekeying. Accordingly, a plurality of retrieval envelopes 134P may be selected, and through the re-encryption process, each can be transformed into a respective one of a plurality of ingestion envelopes 124Q having new wrap keys. Alternatively, it may be desirable to re-encrypt all the envelopes in the cloud data store 150. Under such an example, the cloud storage interface module 152 may select all of the retrieval envelopes 134P for re-encryption, such that each is transformed into a respective one of a plurality of ingestion envelopes 124Q having new wrap keys.

If the data storage system 111 includes a wrap key cache 131, then a wrap key cache module 512 determines whether a first plain wrap key 201P that is associated with the first cypher wrap key 221P is in the wrap key cache 131. If so, then the wrap key cache module 512 may provide the first plain wrap key 201P to the cryptography engine 127. If not, then the wrap key provider interface module 125 may make a request to the wrap key module 462 of the wrap key provider system 161 for the applicable first plain wrap key 201P. Upon receipt of the first plain wrap key 201P by the wrap key provider interface module 125, it is provided to the cryptography engine 127 and optionally added to the wrap key cache 131 by the wrap key cache module 512.

The cryptography engine 127 may use the first plain wrap key 201P to decrypt the first cypher data key 224P to form the plain data key 204P. A wrap key pool module 412 of the data storage system 111 may manage the wrap key pool 121 and select a second plain wrap key 201Q and an associated second cypher wrap key 221Q. In some embodiments, the wrap key pool module 412 manages a thread-safe mechanism for multiple threads with the key pool, such as a buffer that is consumed with multiple threads. The wrap key pool module 412 may also update or modify the metric 202 and, if a threshold is exceeded, erase the second plain wrap key 201Q and the associated second cypher wrap key 221Q. The wrap key provider interface module 125 may transmit a request for a new plain wrap key 201 and an associated cypher wrap key 221 from a wrap key module 462 of the wrap key provider system 161.

The cryptography engine 127 may use the second plain wrap key 201Q to re-encrypt the plain data key 204P to form the second cypher data key 224Q. The cloud storage interface module 152 may transmit the ingestion envelope 124Q to the cloud data store 150 to be stored as the cloud data 151. In various embodiments, the ingestion envelope 124Q includes the second cypher wrap key 221Q, the second cypher data key 224Q, and the cypher data particle 223P. In some embodiments, the ingestion envelope 124Q includes additional cryptography material.

In alternative embodiments, a retrieval operation is performed by the data storage system 111 based on a re-encryption request. The cloud storage interface module 152 may receive the retrieval envelope 134R from the cloud data 151 of the cloud data store 150. In various embodiments, the retrieval envelope 134R includes the first cypher wrap key 221R, the first cypher data key 224R, and the first cypher data particle 223R. In some embodiments, the retrieval envelope 134R includes additional cryptography material. If the data storage system 111 includes a wrap key cache 131, then a wrap key cache module 512 determines whether a first plain wrap key 201R that is associated with the first cypher wrap key 221R is in the wrap key cache 131. If so, then the wrap key cache module 512 may provide the first plain wrap key 201R to the cryptography engine 127. If not, then the wrap key provider interface module 125 may make a request to the wrap key module 462 of the wrap key provider system 161 for the applicable first plain wrap key 201R. Upon receipt of the first plain wrap key 201R by the wrap key provider interface module 125, it is provided to the cryptography engine 127 and optionally added to the wrap key cache 131 by the wrap key cache module 512.

The cryptography engine 127 may use the first plain wrap key 201R to decrypt the first cypher data key 224R to form the first plain data key 204R. The cryptography engine 127 may use the first plain data key 204R to decrypt the first cypher data particle 223R to form the plain data particle 203R.

The data key generator 126 may generate a second plain data key 204S, and the cryptography engine 127 may re-encrypt the plain data particle 203R with the second plain data key 204S to form the second cypher data particle 223S. A wrap key pool module 412 of the data storage system 111 may manage the wrap key pool 121 and select a second plain wrap key 201S and an associated second cypher wrap key 221S. In some embodiments, the wrap key pool module 412 manages a thread-safe mechanism for multiple threads with the key pool, such as a buffer that is consumed with multiple threads. The wrap key pool module 412 may also update or modify the metric 202 and, if a threshold is exceeded, erase the second plain wrap key 201S and the associated second cypher wrap key 221S. The wrap key provider interface module 125 may transmit a request for a new plain wrap key 201 and an associated cypher wrap key 221 from a wrap key module 462 of the wrap key provider system 161.

The cryptography engine 127 may use the second plain wrap key 201S to encrypt the second plain data key 204S to form the second cypher data key 224S. The cloud storage interface module 152 may transmit the ingestion envelope 124S to the cloud data store 150 to be stored as the cloud data 151. In various embodiments, the ingestion envelope 124S includes the second cypher wrap key 221S, the second cypher data key 224S, and the second cypher data particle 223S. In some embodiments, the ingestion envelope 124S includes additional cryptography material.

In some embodiments, the cloud storage interface module 152 provides envelope data to a predictive analytics module 1002. The predictive analytics module 1002 may select which retrieval envelopes 134P of the cloud data store 150 are to be re-encrypted, such that each is transformed into a respective ingestion envelope 124Q with a new wrap key. The predictive analytics module 1002 may be trained using the envelope data as a training data set, according to one embodiment. The envelope data may include information that is indicative of a rekeying operation being necessary and/or beneficial. For example, a rekeying operation may be indicated based on a determination of data having been compromised by a data vandal, such as a portion of data or all of the data. For further example, a rekeying operation may be indicated based on a time period expiring since a prior rekeying operation. Under some embodiments, the training operations of the predictive analytics module 1002 may include one or more of regression, logistic regression, decision trees, artificial neural networks, support vector machines, linear regression, nearest neighbor methods, distance based methods, naive Bayes, linear discriminant analysis, k-nearest neighbor algorithm, another query classifier, and any other presently known or later developed predictive model training operations, according to one embodiment.

Figure 11:
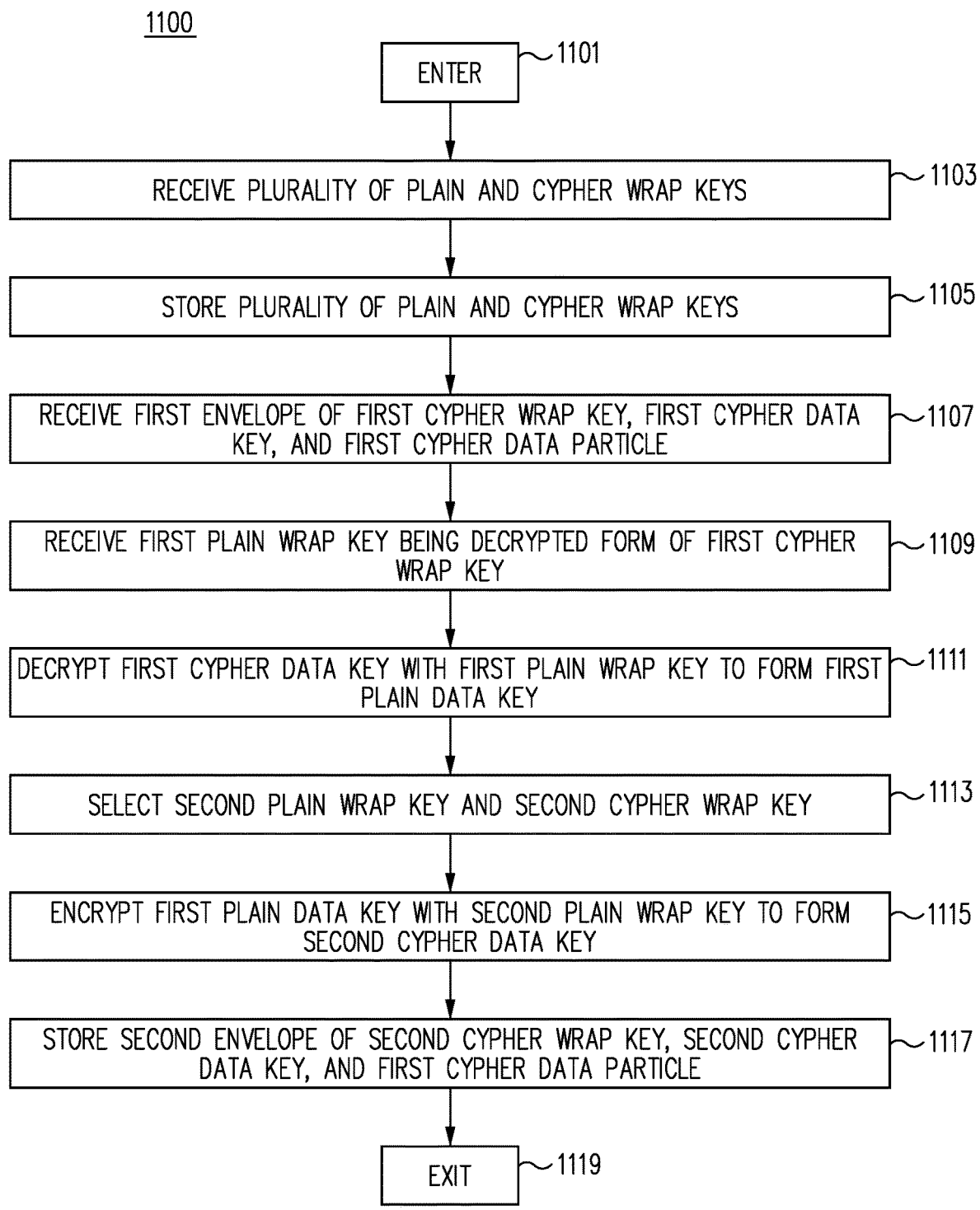
FIG. 11 is a flow diagram of a process for re-encryption with hierarchical cryptographic key management, in accordance with various embodiments.

FIG. 11 is a flow diagram of a process 1100 for re-encryption with hierarchical cryptographic key management, in accordance with various embodiments.

Referring to FIGS. 1, 2, 8, 9, 10, and 11 together, the process 1100 for re-encrypting data with hierarchical cryptographic key management begins at ENTER OPERATION 1101 and process flow proceeds to RECEIVE PLURALITY OF PLAIN AND CYPHER WRAP KEYS OPERATION 1103.

In one embodiment, at RECEIVE PLURALITY OF PLAIN AND CYPHER WRAP KEYS OPERATION 1103, a plurality of plain wrap keys 201 and a plurality of cypher wrap keys 221 are received by the wrap key provider interface module 125 via a communication channel from a wrap key provider system 161, in which each of the plurality of cypher wrap keys 221 is in an encrypted form of a respective one of the plurality of plain wrap keys 201. The wrap key provider system 161 may be a provider of keys that are generated based on a master key. For example, a wrap key provider system 161 can hold a master key that is, for example, identified with a master key identifier. A plain wrap key 201 can be generated by the wrap key provider system 161 that is an unencrypted key, and the plain wrap key 201 can be encrypted with the master key to form a cypher wrap key 221 that is an encrypted form of the plain wrap key 201. A wrap key module 462 of the wrap key provider system 161 may transmit a plain wrap key 201 and the associated cypher wrap key 221 to the wrap key provider interface module 125 of the data storage system 111.

In one embodiment, once a plurality of plain wrap keys 201 and a plurality of cypher wrap keys 221 are received at RECEIVE PLURALITY OF PLAIN AND CYPHER WRAP KEYS OPERATION 1103, process flow proceeds to STORE PLURALITY OF PLAIN AND CYPHER WRAP KEYS OPERATION 1105.

In one embodiment, at STORE PLURALITY OF PLAIN AND CYPHER WRAP KEYS OPERATION 1105, the plurality of plain wrap keys 201 and the plurality of cypher wrap keys 221 are stored in a wrap key pool 121 by a wrap key pool module 412. Under various embodiments, the data storage system 111 includes the cryptography data store 112 having the wrap key pool 121. The wrap key pool 121 may hold the plurality of plain wrap keys 201 and the plurality of cypher wrap keys 221, and the wrap key pool module 412 can manage the storage of keys in the wrap key pool 121. For example, when a plain wrap key 201 is to be selected from the wrap key pool 121, the wrap key pool module 412 can make that selection such as by randomly selecting a plain wrap key 201 from the wrap key pool module 412. Furthermore, after a plain wrap key 201 is selected, the associated metric 202 for the plain wrap key 201 can be updated to reflect the selection, such as incrementing a counter. For example, if a counter had a value of three before the associated plain wrap key 201 is selected, after selection the counter can be incremented to have a value of four.

It is to be understood that a metric 202 can be updated any time after a selection of a plain wrap key 201 is made. Furthermore, the wrap key pool module 412 can determine when a metric 202 exceeds a threshold that indicates that the plain wrap key 201 can be removed from the wrap key pool 121. For example, if a threshold value is ten, and a metric 202 has a value of ten prior to selection of the associated plain wrap key 201, then after the selection the metric 202 can be modified to be eleven, which exceeds the threshold value of ten. Accordingly, since a threshold value has been determined to be exceeded, the wrap key pool module 412 can remove the plain wrap key 201 and the associated cypher wrap key 221 from the wrap key pool 121, and can transmit a request for a new plain wrap key 201 and a new associated cypher wrap key 221 from the wrap key provider system 161 via the wrap key provider interface module 125.

Under some embodiments, each plain wrap key 201 of the plurality of plain wrap keys is received serially. For example, a first request from the wrap key pool module 412 can result in receipt of a first plain wrap key 201, and a second request from the wrap key pool module 412 can result in receipt of a second plain wrap key 201. Under some embodiments, each plain wrap key 201 is received after a request from the wrap key pool module 412 for a new plain wrap key 201. Under other embodiments, a plurality of wrap keys 201 can be received in parallel as a group of keys from the wrap key provider system 161.

In one embodiment, once the plurality of plain wrap keys 201 and the plurality of cypher wrap keys 221 are stored at STORE PLURALITY OF PLAIN AND CYPHER WRAP KEYS OPERATION 1105, process flow proceeds to RECEIVE FIRST ENVELOPE OF FIRST CYPHER WRAP KEY, FIRST CYPHER DATA KEY, AND FIRST CYPHER DATA PARTICLE OPERATION 1107.

In one embodiment, at RECEIVE FIRST ENVELOPE OF FIRST CYPHER WRAP KEY, FIRST CYPHER DATA KEY, AND FIRST CYPHER DATA PARTICLE OPERATION 1107, a first envelope 134P or a retrieval envelope is received. In some embodiments, the first envelope 134P is received from the cloud data store 150 via the cloud storage interface module 152. In some embodiments, the first envelope 134P may include a first cypher wrap key 221P, a first cypher data key 224P, and a first cypher data particle 223P. It is to be understood that the first envelope 134P may include additional cryptographic material such as one or more initialization vectors, an identifier of the first cypher wrap key 221P, and the like.

In one embodiment, once the first envelope 134P is received at RECEIVE FIRST ENVELOPE OF FIRST CYPHER WRAP KEY, FIRST CYPHER DATA KEY, AND FIRST CYPHER DATA PARTICLE OPERATION 1107, process flow proceeds to RECEIVE FIRST PLAIN WRAP KEY BEING DECRYPTED FORM OF FIRST CYPHER WRAP KEY OPERATION 1109.

In one embodiment, at RECEIVE FIRST PLAIN WRAP KEY BEING DECRYPTED FORM OF FIRST CYPHER WRAP KEY OPERATION 1109, the wrap key provider interface module 125 of the data storage system 111 can transmit the first cypher wrap key 221P to the wrap key module 462 of the wrap key provider system 161. In various embodiments, the wrap key module 462 can decrypt a cypher wrap key 221P with a master key to form a plain wrap key 201P that is transmitted to the wrap key provider interface module 125. In various embodiments, a cypher wrap key 221P is compared and matched with a plurality of cypher wrap keys, and a respective plain wrap key 201P is selected and transmitted to the wrap key provider interface module 125. In various embodiments, the first plain wrap key 201P is received by the wrap key provider interface module 125 from the wrap key module 462. In various embodiments, the first plain wrap key 201P is a decrypted form of the first cypher wrap key 221P.

In one embodiment, once the first plain wrap key 201P is received at RECEIVE FIRST PLAIN WRAP KEY BEING DECRYPTED FORM OF FIRST CYPHER WRAP KEY OPERATION 1109, process flow proceeds to DECRYPT FIRST CYPHER DATA KEY WITH FIRST PLAIN WRAP KEY TO FORM FIRST PLAIN DATA KEY OPERATION 1111.

In one embodiment, at DECRYPT FIRST CYPHER DATA KEY WITH FIRST PLAIN WRAP KEY TO FORM FIRST PLAIN DATA KEY OPERATION 1111, the cryptography engine 127 may decrypt the first cypher data key 224P with the first plain wrap key 201P to form the first plain data key 204P, such that the first cypher data particle 223P is decryptable with the first plain data key 204P to form a plain data particle 203.

In one embodiment, once the first cypher data key 224P is decrypted with the first plain wrap key 201P to form the first plain data key 204P at DECRYPT FIRST CYPHER DATA KEY WITH FIRST PLAIN WRAP KEY TO FORM FIRST PLAIN DATA KEY OPERATION 1111, process flow proceeds to SELECT SECOND PLAIN WRAP KEY AND SECOND CYPHER WRAP KEY OPERATION 1113.

In one embodiment, at SELECT SECOND PLAIN WRAP KEY AND SECOND CYPHER WRAP KEY OPERATION 1113, a second plain wrap key 201Q is selected from the plurality of plain wrap keys. In various embodiments, the plurality of plain wrap keys is stored in the wrap key pool 121 and the second plain wrap key 201Q is selected by the wrap key pool module 412. Under various embodiments, the selection of a second plain wrap key 201Q is done as a random selection from the plurality of plain wrap keys stored in the wrap key pool 121.

In various embodiments, a second cypher wrap key 221Q is determined from the plurality of cypher wrap keys such that the second cypher wrap key 221Q is associated with the second plain wrap key 201Q. In various embodiments, the second cypher wrap key 221Q is an encrypted form of the second plain wrap key 201Q. In various embodiments, each cypher wrap key 221 of the plurality of cypher wrap keys are stored in the wrap key pool 121 in association with a respective plain wrap key 201 of the plurality of plain wrap keys. Under various embodiments, the wrap key pool module 412 determines the second cypher wrap key 221Q that is associated with the respective second plain wrap key 201Q. Under various embodiments, there is a one-to-one relationship between a plain wrap key 201 and a respective cypher wrap key 221.

In one embodiment, once the second plain wrap key 201Q and the second cypher wrap key 221Q is selected at SELECT SECOND PLAIN WRAP KEY AND SECOND CYPHER WRAP KEY OPERATION 1113, process flow proceeds to ENCRYPT FIRST PLAIN DATA KEY WITH SECOND PLAIN WRAP KEY TO FORM SECOND CYPHER DATA KEY OPERATION 1115.

In one embodiment, at ENCRYPT FIRST PLAIN DATA KEY WITH SECOND PLAIN WRAP KEY TO FORM SECOND CYPHER DATA KEY OPERATION 1115, the first plain data key 204P is encrypted with the second plain wrap key 201Q to form a second cypher data key 224Q. In various embodiments, the cryptography engine 127 performs the encryption of the first plain data key 204P. In various embodiments, the cryptography engine 127 receives the second plain wrap key 201Q from the wrap key pool module 412. In various embodiments, there is a one-to-many relationship between a plain wrap key 201 and a plurality of cypher data keys 224. In other words, the second plain wrap key 201Q may be selected more than once to encrypt another plain data key 204.

In one embodiment, once the first plain data key 204P is encrypted with the second plain wrap key 201Q to form the second cypher data key 224Q at ENCRYPT FIRST PLAIN DATA KEY WITH SECOND PLAIN WRAP KEY TO FORM SECOND CYPHER DATA KEY OPERATION 1115, process flow proceeds to STORE SECOND ENVELOPE OF SECOND CYPHER WRAP KEY, SECOND CYPHER DATA KEY, AND FIRST CYPHER DATA PARTICLE OPERATION 1117.

In one embodiment, at STORE SECOND ENVELOPE OF SECOND CYPHER WRAP KEY, SECOND CYPHER DATA KEY, AND FIRST CYPHER DATA PARTICLE OPERATION 1117, the second cypher wrap key 221Q, the second cypher data key 224Q, and the first cypher data particle 223P is stored in the cloud data store 150. Under various embodiments, the cloud interface module 152 stores in the cloud data store 150 the second cypher wrap key 221Q, the second cypher data key 224Q, and the first cypher data particle 223P. Under various embodiments, a second envelope 124Q or an ingestion envelope is formed from the second cypher wrap key 221Q, the second cypher data key 224Q, and the first cypher data particle 223P, and the second envelope 124Q is stored in the cloud data store 150. Under some embodiments, the second cypher wrap key 221Q can be considered a wrapper of the second envelope 124Q.

In one embodiment, once the second envelope 124Q is stored at STORE SECOND ENVELOPE OF SECOND CYPHER WRAP KEY, SECOND CYPHER DATA KEY, AND FIRST CYPHER DATA PARTICLE OPERATION 1117, process flow proceeds to EXIT OPERATION 1119.

In one embodiment, at EXIT OPERATION 1119, process 1100 for re-encrypting data with hierarchical cryptographic key management is exited.

In various embodiments, once the second plain wrap key 201Q and the second cypher wrap key 221Q is selected at SELECT SECOND PLAIN WRAP KEY AND SECOND CYPHER WRAP KEY OPERATION 1113, the second plain wrap key 201Q may be removed from the wrap key pool 121. In various embodiments, the second plain wrap key 201Q is stored in volatile memory and the wrap key pool module 412 removes the second plain wrap key 201Q from the wrap key pool 121 by erasing the second plain wrap key 201Q from the volatile memory.

After the second plain wrap key 201Q is removed from the wrap key pool 121, the wrap key pool module 412 can determine a replenishment of the wrap key pool 121. For example, the wrap key pool module 412 may receive another plain wrap key 201 and another cypher wrap key 221 from the wrap key provider system 161, and the wrap key pool module 412 may store the other plain wrap key 201 and the other cypher wrap key 221 in the wrap key pool 121. Such may, for example, replenish the wrap key pool 121 after one or more plain wrap keys 201 and cypher wrap keys 221 are removed from the wrap key pool 121.

In various embodiments, once the process 1100 is exited at EXIT OPERATION 1119, another retrieval envelope 134 may be re-encrypted to form another ingestion envelope 124. For example, a third envelope 134P may be received from the cloud data store 150. The third envelope 134P may comprise a third cypher wrap key 221P, a third cypher data key 224P, and a second cypher data particle 223P. The cryptography engine 127 may receive a third plain wrap key 201P being a decrypted form of the third cypher wrap key 221P. The cryptography engine 127 may decrypt the third cypher data key 224P with the third plain wrap key 201P to form a second plain data key 204P, such that the second cypher data particle 223P is decryptable with the second plain data key 204P to form a plain data particle 203.

The wrap key pool module 412 may select, from the wrap key pool 121, a fourth plain wrap key 201Q and a fourth cypher wrap key 221Q being an encrypted form of the fourth plain wrap key 201Q. It is to be understood that, due to the one-to-many relationship between a wrap key and a plurality of data keys, instead of selecting a fourth plain wrap key 201Q and a fourth cypher wrap key 221Q, the second plain wrap key 201Q and the second cypher wrap key 221Q at SELECT SECOND PLAIN WRAP KEY AND SECOND CYPHER WRAP KEY OPERATION 1113 may be selected. Under some embodiments, the fourth plain wrap key 201Q is selectable to encrypt a plurality of plain data keys. The cryptography engine 127 may encrypt the second plain data key 204P with the fourth plain wrap key 201Q to form a fourth cypher data key 224Q. Alternatively, the cryptography engine 127 may encrypt the second plain data key 204P with the second plain wrap key 201Q to form a fourth cypher data key 224Q. The cloud storage interface module 152 may transmit, to the cloud data store 150, a fourth envelope 124Q or an ingestion envelope. The fourth envelope 124Q may be formed from the fourth cypher wrap key 221Q, the fourth cypher data key 224Q, and the second cypher data particle 223P.

In various embodiments, once the first plain wrap key 201P is received at RECEIVE FIRST PLAIN WRAP KEY BEING DECRYPTED FORM OF FIRST CYPHER WRAP KEY OPERATION 1109, the first plain wrap key 201P and the first cypher wrap key 221P can be stored in a wrap key cache 131. The wrap key cache 131 can, for example, temporarily store recently requested plain wrap keys 201, in order to reduce the number of network calls made to the wrap key provider system 161 to decrypt retrieved data. Each plain wrap key 201 and each associated cypher wrap key 221 in the wrap key cache 131 can be removed from the wrap key cache 131 after a determined time period elapses, such as twenty minutes.

In various embodiments, the wrap key cache module 512 can determine that the first cypher wrap key 221P is not held by the wrap key cache 131, and thus, a request can be transmitted to the wrap key provider system 161 for receipt of the associated first plain wrap key 201P. Alternatively, the wrap key cache module 512 can determine that the first cypher wrap key 221P is held by the wrap key cache 131 as a first cypher wrap key 221P with an associated first plain wrap key 201P. For example, the wrap key cache module 512 can include a second plurality of plain wrap keys and a second plurality of cypher wrap keys, and each of the second plurality of cypher wrap keys is an encrypted form of a respective one of the second plurality of plain wrap keys. The wrap key cache module 512 can determine that the first cypher wrap key 221P is a member of the second plurality of cypher wrap keys of the wrap key cache 131. The wrap key cache module 512 can retrieve the first plain wrap key 201P that is associated with the first cypher wrap key 221P in the wrap key cache 131.

Figure 12:
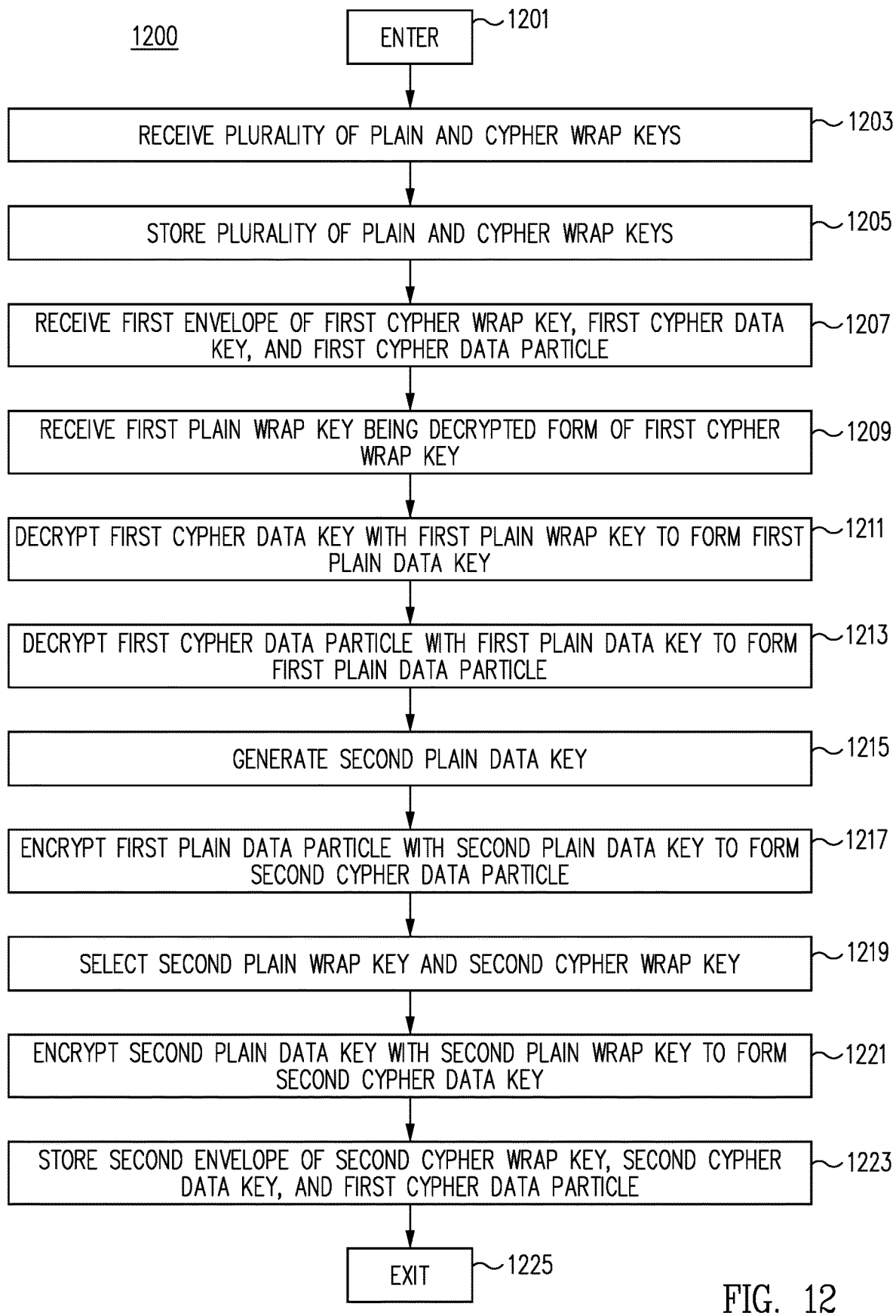
FIG. 12 is a flow diagram of a process for re-encryption with hierarchical cryptographic key management, in accordance with various embodiments.

FIG. 12 is a flow diagram of a process 1200 for re-encryption with hierarchical cryptographic key management, in accordance with various embodiments.

Referring to FIGS. 1, 2, 8, 9, 10, and 12 together, the process 1200 for re-encrypting data with hierarchical cryptographic key management begins at ENTER OPERATION 1201 and process flow proceeds to RECEIVE PLURALITY OF PLAIN AND CYPHER WRAP KEYS OPERATION 1203.

In one embodiment, at RECEIVE PLURALITY OF PLAIN AND CYPHER WRAP KEYS OPERATION 1203, a plurality of plain wrap keys 201 and a plurality of cypher wrap keys 221 are received by the wrap key provider interface module 125 via a communication channel from a wrap key provider system 161, in which each of the plurality of cypher wrap keys 221 is in an encrypted form of a respective one of the plurality of plain wrap keys 201. The wrap key provider system 161 may be a provider of keys that are generated based on a master key. For example, a wrap key provider system 161 can hold a master key that is, for example, identified with a master key identifier. A plain wrap key 201 can be generated by the wrap key provider system 161 that is an unencrypted key, and the plain wrap key 201 can be encrypted with the master key to form a cypher wrap key 221 that is an encrypted form of the plain wrap key 201. A wrap key module 462 of the wrap key provider system 161 may transmit a plain wrap key 201 and the associated cypher wrap key 221 to the wrap key provider interface module 125 of the data storage system 111.

In one embodiment, once a plurality of plain wrap keys 201 and a plurality of cypher wrap keys 221 are received at RECEIVE PLURALITY OF PLAIN AND CYPHER WRAP KEYS OPERATION 1203, process flow proceeds to STORE PLURALITY OF PLAIN AND CYPHER WRAP KEYS OPERATION 1205.

In one embodiment, at STORE PLURALITY OF PLAIN AND CYPHER WRAP KEYS OPERATION 1205, the plurality of plain wrap keys 201 and the plurality of cypher wrap keys 221 are stored in a wrap key pool 121 by a wrap key pool module 412. Under various embodiments, the data storage system 111 includes the cryptography data store 112 having the wrap key pool 121. The wrap key pool 121 may hold the plurality of plain wrap keys 201 and the plurality of cypher wrap keys 221, and the wrap key pool module 412 can manage the storage of keys in the wrap key pool 121. For example, when a plain wrap key 201 is to be selected from the wrap key pool 121, the wrap key pool module 412 can make that selection such as by randomly selecting a plain wrap key 201 from the wrap key pool module. Furthermore, after a plain wrap key 201 is selected, the associated metric 202 for the plain wrap key 201 can be updated to reflect the selection, such as incrementing a counter. For example, if a counter had a value of three before the associated plain wrap key 201 is selected, after selection the counter can be incremented to have a value of four.

It is to be understood that a metric 202 can be updated any time after a selection of a plain wrap key 201 is made. Furthermore, the wrap key pool module 412 can determine when a metric 202 exceeds a threshold that indicates that the plain wrap key 201 can be removed from the wrap key pool 121. For example, if a threshold value is ten, and a metric 202 has a value of ten prior to selection of the associated plain wrap key 201, then after the selection the metric 202 can be modified to be eleven, which exceeds the threshold value of ten. Accordingly, since a threshold value has been determined to be exceeded, the wrap key pool module 412 can remove the plain wrap key 201 and the associated cypher wrap key 221 from the wrap key pool 121, and can transmit a request for a new plain wrap key 201 and a new associated cypher wrap key 221 from the wrap key provider system 161 via the wrap key provider interface module 125.

Under some embodiments, each plain wrap key 201 of the plurality of plain wrap keys is received serially. For example, a first request from the wrap key pool module 412 can result in receipt of a first plain wrap key 201, and a second request from the wrap key pool module 412 can result in receipt of a second plain wrap key 201. Under some embodiments, each plain wrap key 201 is received after a request from the wrap key pool module 412 for a new plain wrap key 201. Under other embodiments, a plurality of wrap keys 201 can be received in parallel as a group of keys from the wrap key provider system 161.

In one embodiment, once the plurality of plain wrap keys 201 and the plurality of cypher wrap keys 221 are stored at STORE PLURALITY OF PLAIN AND CYPHER WRAP KEYS OPERATION 1205, process flow proceeds to RECEIVE FIRST ENVELOPE OF FIRST CYPHER WRAP KEY, FIRST CYPHER DATA KEY, AND FIRST CYPHER DATA PARTICLE OPERATION 1207.

In one embodiment, at RECEIVE FIRST ENVELOPE OF FIRST CYPHER WRAP KEY, FIRST CYPHER DATA KEY, AND FIRST CYPHER DATA PARTICLE OPERATION 1207, a first envelope 134R or a retrieval envelope is received. In some embodiments, the first envelope 134R is received from the cloud data store 150 via the cloud storage interface module 152. In some embodiments, the first envelope 134R may include a first cypher wrap key 221R, a first cypher data key 224R, and a first cypher data particle 223R. It is to be understood that the first envelope 134R may include additional cryptographic material such as one or more initialization vectors, an identifier of the first cypher wrap key 221R, and the like.

In one embodiment, once the first envelope 134R is received at RECEIVE FIRST ENVELOPE OF FIRST CYPHER WRAP KEY, FIRST CYPHER DATA KEY, AND FIRST CYPHER DATA PARTICLE OPERATION 1207, process flow proceeds to RECEIVE FIRST PLAIN WRAP KEY BEING DECRYPTED FORM OF FIRST CYPHER WRAP KEY OPERATION 1209.

In one embodiment, at RECEIVE FIRST PLAIN WRAP KEY BEING DECRYPTED FORM OF FIRST CYPHER WRAP KEY OPERATION 1209, the wrap key provider interface module 125 of the data storage system 111 can transmit the first cypher wrap key 221R to the wrap key module 462 of the wrap key provider system 161. In various embodiments, the wrap key module 462 can decrypt a cypher wrap key 221R with a master key to form a plain wrap key 201R that is transmitted to the wrap key provider interface module 125. In various embodiments, a cypher wrap key 221R is compared and matched with a plurality of cypher wrap keys, and a respective plain wrap key 201R is selected and transmitted to the wrap key provider interface module 125. In various embodiments, the first plain wrap key 201R is received by the wrap key provider interface module 125 from the wrap key module 462. In various embodiments, the first plain wrap key 201R is a decrypted form of the first cypher wrap key 221R.

In one embodiment, once the first plain wrap key 201R is received at RECEIVE FIRST PLAIN WRAP KEY BEING DECRYPTED FORM OF FIRST CYPHER WRAP KEY OPERATION 1209, process flow proceeds to DECRYPT FIRST CYPHER DATA KEY WITH FIRST PLAIN WRAP KEY TO FORM FIRST PLAIN DATA KEY OPERATION 1211.

In one embodiment, at DECRYPT FIRST CYPHER DATA KEY WITH FIRST PLAIN WRAP KEY TO FORM FIRST PLAIN DATA KEY OPERATION 1211, the cryptography engine 127 may decrypt the first cypher data key 224R with the first plain wrap key 201R to form the first plain data key 204R.

In one embodiment, once the first cypher data key 224R is decrypted with the first plain wrap key 201R to form the first plain data key 204R at DECRYPT FIRST CYPHER DATA KEY WITH FIRST PLAIN WRAP KEY TO FORM FIRST PLAIN DATA KEY OPERATION 1211, process flow proceeds to DECRYPT FIRST CYPHER DATA PARTICLE WITH FIRST PLAIN DATA KEY TO FORM FIRST PLAIN DATA PARTICLE OPERATION 1213.

In one embodiment, at DECRYPT FIRST CYPHER DATA PARTICLE WITH FIRST PLAIN DATA KEY TO FORM FIRST PLAIN DATA PARTICLE OPERATION 1213, the cryptography engine 127 may decrypt the first cypher data particle 223R with the first plain data key 204R to form the first plain data particle 203R.

In one embodiment, once the first cypher data particle 223R is decrypted with the first plain data key 204R to form the first plain data particle 203R at DECRYPT FIRST CYPHER DATA PARTICLE WITH FIRST PLAIN DATA KEY TO FORM FIRST PLAIN DATA PARTICLE OPERATION 1213, process flow proceeds to GENERATE SECOND PLAIN DATA KEY OPERATION 1215.

In one embodiment, at GENERATE SECOND PLAIN DATA KEY OPERATION 1215, a second plain data key 204S is generated. In some embodiments, the second plain data key 204S is generated by the data key generator 126 of the data storage system 111. Under various embodiments, there is a one-to-one relationship between each plain data key 204 and the respective plain data particle 203 that is received. Under various embodiments, a generated plain data key 204 is paired with a decrypted plain data particle 203.

In one embodiment, once the second plain data key 204S is generated at GENERATE SECOND PLAIN DATA KEY OPERATION 1215, process flow proceeds to ENCRYPT FIRST PLAIN DATA PARTICLE WITH SECOND PLAIN DATA KEY TO FORM SECOND CYPHER DATA PARTICLE OPERATION 1217.

In one embodiment, at ENCRYPT FIRST PLAIN DATA PARTICLE WITH SECOND PLAIN DATA KEY TO FORM SECOND CYPHER DATA PARTICLE OPERATION 1217, the first plain data particle 203R is encrypted with the second plain data key 204S to form a second cypher data particle 223S. In some embodiments, the cryptography engine 127 performs the encryption of the first plain data particle 203R.

In one embodiment, once the first plain data particle 203R is encrypted with the second plain data key 204S to form a second cypher data particle 223S at ENCRYPT FIRST PLAIN DATA PARTICLE WITH SECOND PLAIN DATA KEY TO FORM SECOND CYPHER DATA PARTICLE OPERATION 1217, process flow proceeds to SELECT SECOND PLAIN WRAP KEY AND SECOND CYPHER WRAP KEY OPERATION 1219.

In one embodiment, at SELECT SECOND PLAIN WRAP KEY AND SECOND CYPHER WRAP KEY OPERATION 1219, a second plain wrap key 201S is selected from the plurality of plain wrap keys. In various embodiments, the plurality of plain wrap keys is stored in the wrap key pool 121 and the second plain wrap key 201S is selected by the wrap key pool module 412. Under various embodiments, the selection of a second plain wrap key 201S is done as a random selection from the plurality of plain wrap keys stored in the wrap key pool 121.

In various embodiments, a second cypher wrap key 221S is determined from the plurality of cypher wrap keys such that the second cypher wrap key 221S is associated with the second plain wrap key 201S. In various embodiments, the second cypher wrap key 221S is an encrypted form of the second plain wrap key 201S. In various embodiments, each cypher wrap key 221 of the plurality of cypher wrap keys are stored in the wrap key pool 121 in association with a respective plain wrap key 201 of the plurality of plain wrap keys. Under various embodiments, the wrap key pool module 412 determines the second cypher wrap key 221S that is associated with the respective second plain wrap key 201S. Under various embodiments, there is a one-to-one relationship between a plain wrap key 201 and a respective cypher wrap key 221.

In one embodiment, once the second plain wrap key 201S and the second cypher wrap key 221S is selected at SELECT SECOND PLAIN WRAP KEY AND SECOND CYPHER WRAP KEY OPERATION 1219, process flow proceeds to ENCRYPT SECOND PLAIN DATA KEY WITH SECOND PLAIN WRAP KEY TO FORM SECOND CYPHER DATA KEY OPERATION 1221.

In one embodiment, at ENCRYPT SECOND PLAIN DATA KEY WITH SECOND PLAIN WRAP KEY TO FORM SECOND CYPHER DATA KEY OPERATION 1221, the second plain data key 204S is encrypted with the second plain wrap key 201S to form a second cypher data key 224S. In various embodiments, the cryptography engine 127 performs the encryption of the second plain data key 204S. In various embodiments, the cryptography engine 127 receives the second plain wrap key 201S from the wrap key pool module 412. In various embodiments, there is a one-to-many relationship between a plain wrap key 201 and a plurality of cypher data keys 224. In other words, the second plain wrap key 201S may be selected more than once to encrypt another plain data key 204.

In one embodiment, once the second plain data key 204S is encrypted with the second plain wrap key 201S to form the second cypher data key 224S at ENCRYPT SECOND PLAIN DATA KEY WITH SECOND PLAIN WRAP KEY TO FORM SECOND CYPHER DATA KEY OPERATION 1221, process flow proceeds to STORE SECOND ENVELOPE OF SECOND CYPHER WRAP KEY, SECOND CYPHER DATA KEY, AND SECOND CYPHER DATA PARTICLE OPERATION 1223.

In one embodiment, at STORE SECOND ENVELOPE OF SECOND CYPHER WRAP KEY, SECOND CYPHER DATA KEY, AND SECOND CYPHER DATA PARTICLE OPERATION 1223, the second cypher wrap key 221S, the second cypher data key 224S, and the second cypher data particle 223S is stored in the cloud data store 150. Under various embodiments, the cloud storage interface module 152 stores in the cloud data store 150 the second cypher wrap key 221S, the second cypher data key 224S, and the second cypher data particle 223S. Under various embodiments, a second envelope 124S or an ingestion envelope is formed from the second cypher wrap key 221S, the second cypher data key 224S, and the second cypher data particle 223S, and the second envelope 124S is stored in the cloud data store 150. Under some embodiments, the second cypher wrap key 221S can be considered a wrapper of the second envelope 124S.

In one embodiment, once the second envelope 124S is stored at STORE SECOND ENVELOPE OF SECOND CYPHER WRAP KEY, SECOND CYPHER DATA KEY, AND SECOND CYPHER DATA PARTICLE OPERATION 1223, process flow proceeds to EXIT OPERATION 1225.

In one embodiment, at EXIT OPERATION 1225, process 1200 for re-encrypting data with hierarchical cryptographic key management is exited.

In various embodiments, once the second plain wrap key 201S and the second cypher wrap key 221S is selected at SELECT SECOND PLAIN WRAP KEY AND SECOND CYPHER WRAP KEY OPERATION 1219, the second plain wrap key 201S may be removed from the wrap key pool 121. In various embodiments, the second plain wrap key 201S is stored in volatile memory and the wrap key pool module 412 removes the second plain wrap key 201S from the wrap key pool 121 by erasing the second plain wrap key 201S from the volatile memory.

After the second plain wrap key 201S is removed from the wrap key pool 121, the wrap key pool module 412 can determine a replenishment of the wrap key pool 121. For example, the wrap key pool module 412 may receive another plain wrap key 201 and another cypher wrap key 221 from the wrap key provider system 161, and the wrap key pool module 412 may store the other plain wrap key 201 and the other cypher wrap key 221 in the wrap key pool 121. Such may, for example, replenish the wrap key pool 121 after one or more plain wrap keys 201 and cypher wrap keys 221 are removed from the wrap key pool 121.

In various embodiments, once the process 1200 is exited at EXIT OPERATION 1225, another retrieval envelope 134 may be re-encrypted to form another ingestion envelope 124. For example, a third envelope 134R may be received from the cloud data store 150. The third envelope 134R may comprise a third cypher wrap key 221R, a third cypher data key 224R, and a third cypher data particle 223R. The cryptography engine 127 may receive a third plain wrap key 201R being a decrypted form of the third cypher wrap key 221R. The cryptography engine 127 may decrypt the third cypher data key 224R with the third plain wrap key 201R to form a third plain data key 204R.

The cryptography engine 127 may decrypt the third cypher data particle 223R with the third plain data key 204R to form a second plain data particle 203R. The data key generator 126 may generate a fourth plain data key 204S that is generatable to encrypt a single plain data particle 203. The cryptography engine 127 may encrypt the second plain data particle 203R with the fourth plain data key 204S to form a fourth cypher data particle 223S.

The wrap key pool module 412 may select, from the wrap key pool 121, a fourth plain wrap key 201S and a fourth cypher wrap key 221S being an encrypted form of the fourth plain wrap key 201S. It is to be understood that, due to the one-to-many relationship between a wrap key and a plurality of data keys, instead of selecting a fourth plain wrap key 201S and a fourth cypher wrap key 221S, the second plain wrap key 201S and the second cypher wrap key 221S at SELECT SECOND PLAIN WRAP KEY AND SECOND CYPHER WRAP KEY OPERATION 1219 may be selected. Under some embodiments, the fourth plain wrap key 201S is selectable to encrypt a plurality of plain data keys. The cryptography engine 127 may encrypt the fourth plain data key 204S with the fourth plain wrap key 201S to form a fourth cypher data key 224S. Alternatively, the cryptography engine 127 may encrypt the fourth plain data key 204S with the second plain wrap key 201S to form a fourth cypher data key 224S. The cloud storage interface module 152 may transmit, to the cloud data store 150, a fourth envelope 124S or an ingestion envelope. The fourth envelope 124S may be formed from the fourth cypher wrap key 221S, the fourth cypher data key 224S, and the fourth cypher data particle 223S.

In various embodiments, once the first plain wrap key 201S is received at RECEIVE FIRST PLAIN WRAP KEY BEING DECRYPTED FORM OF FIRST CYPHER WRAP KEY OPERATION 1209, the first plain wrap key 201R and the first cypher wrap key 221R can be stored in a wrap key cache 131. The wrap key cache 131 can, for example, temporarily store recently requested plain wrap keys 201, in order to reduce the number of network calls made to the wrap key provider system 161 to decrypt retrieved data. Each plain wrap key 201 and each associated cypher wrap key 221 in the wrap key cache 131 can be removed from the wrap key cache 131 after a determined time period elapses, such as twenty minutes.

In various embodiments, the wrap key cache module 512 can determine that the first cypher wrap key 221R is not held by the wrap key cache 131, and thus, a request can be transmitted to the wrap key provider system 161 for receipt of the associated first plain wrap key 201R. Alternatively, the wrap key cache module 512 can determine that the first cypher wrap key 221R is held by the wrap key cache 131 as a first cypher wrap key 221R with an associated first plain wrap key 201R. For example, the wrap key cache module 512 can include a second plurality of plain wrap keys and a second plurality of cypher wrap keys, and each of the second plurality of cypher wrap keys is an encrypted form of a respective one of the second plurality of plain wrap keys. The wrap key cache module 512 can determine that the first cypher wrap key 221R is a member of the second plurality of cypher wrap keys of the wrap key cache 131. The wrap key cache module 512 can retrieve the first plain wrap key 201R that is associated with the first cypher wrap key 221R in the wrap key cache 131.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A cryptographic system for use with a cloud data storage service, comprising:
   at least one processor;
   at least one communication channel coupled to the at least one processor; and
   at least one memory coupled to the at least one processor, the at least one memory having stored therein instructions which when executed by the at least one processor, perform a process for use with the cloud data storage service, the process including:
   receiving, from a wrap key provider system, a first plurality of plain wrap keys and a first plurality of cypher wrap keys, each of the first plurality of cypher wrap keys being an encrypted form of a respective one of the first plurality of plain wrap keys;
   storing, in a wrap key pool, the first plurality of plain wrap keys and the first plurality of cypher wrap keys, the storage process including determining individual use thresholds for each plain wrap key within the first plurality of plain wrap keys and each cypher wrap key within the first plurality of cypher wrap keys, the individual use thresholds being randomly determined and within a range of allowable thresholds, the individual use thresholds representing a maximum number of uses for each key having a threshold, wherein the storage operation replaces a key that has been used a number of times equal to or exceeding its threshold;
   receiving, from a cloud data store, a first envelope, the first envelope comprising a first cypher wrap key, a first cypher data key, and a first cypher data particle;
   receiving a first plain wrap key comprising a decrypted form of the first cypher wrap key;
   decrypting the first cypher data key with the first plain wrap key to form a first plain data key, the first cypher data particle being decryptable with the first plain data key to form a first plain data particle;
   selecting, from the wrap key pool, a second plain wrap key and a second cypher wrap key comprising an encrypted form of the second plain wrap key, the second plain wrap key selectable to encrypt a first plurality of plain data keys;
   encrypting the first plain data key with the second plain wrap key to form a second cypher data key; and
   transmitting, to the cloud data store, a second envelope, the second envelope formed from the second cypher wrap key, the second cypher data key, and the first cypher data particle.

2. The cryptographic system of claim 1, further comprising:
   storing, in the wrap key pool, a first metric associated with the second plain wrap key, the first metric having a first value indicative of an availability of the second plain wrap key for encryption.

3. The cryptographic system of claim 1, further comprising:
   determining a replenishment of the wrap key pool;
   receiving, from the wrap key provider system, an other plain wrap key and an other cypher wrap key being an encrypted form of the other plain wrap key; and
   storing, in the wrap key pool, the other plain wrap key and the other cypher wrap key.

4. The cryptographic system of claim 1, further comprising:
   receiving, from the cloud data store, a third envelope, the third envelope comprising a third cypher wrap key, a third cypher data key, and a second cypher data particle;
   receiving a third plain wrap key being a decrypted form of the third cypher wrap key;
   decrypting the third cypher data key with the third plain wrap key to form a second plain data key, the second cypher data particle being decryptable with the second plain data key to form a second plain data particle;
   selecting, from the wrap key pool, a fourth plain wrap key and a fourth cypher wrap key being an encrypted form of the fourth plain wrap key, the fourth plain wrap key selectable to encrypt a second plurality of plain data keys;
   encrypting the second plain data key with the fourth plain wrap key to form a fourth cypher data key; and
   transmitting, to the cloud data store, a fourth envelope, the fourth envelope formed from the fourth cypher wrap key, the fourth cypher data key, and the second cypher data particle.

5. The cryptographic system of claim 1, further comprising:
   storing, in a wrap key cache, a second plurality of plain wrap keys and a second plurality of cypher wrap keys, each of the second plurality of cypher wrap keys being an encrypted form of a respective one of the second plurality of plain wrap keys,
   wherein receiving the first plain wrap key being a decrypted form of the first cypher wrap key is received from the wrap key cache.

6. A cryptographic system for use with a cloud data storage service, comprising:
   at least one processor;
   at least one communication channel coupled to the at least one processor; and
   at least one memory coupled to the at least one processor, the at least one memory having stored therein instructions which when executed by any set of the at least one processor, perform a process for use with the cloud data storage service, the process including:

receiving, from a wrap key provider system, a first plurality of plain wrap keys and a first plurality of cypher wrap keys, each of the first plurality of cypher wrap keys being an encrypted form of a respective one of the first plurality of plain wrap keys;

storing, in a wrap key pool, the first plurality of plain wrap keys and the first plurality of cypher wrap keys, the storage process including determining individual use thresholds for each plain wrap key within the first plurality of plain wrap keys and each cypher wrap key within the first plurality of cypher wrap keys, the individual use thresholds being randomly determined and within a range of allowable thresholds, the individual use thresholds representing a maximum number of uses for each key having a threshold, wherein the storage operation replaces a key that has been used a number of times equal to or exceeding its threshold;

receiving, from a cloud data store, a first envelope, the first envelope comprising a first cypher wrap key, a first cypher data key, and a first cypher data particle;

receiving a first plain wrap key comprising a decrypted form of the first cypher wrap key;

decrypting the first cypher data key with the first plain wrap key to form a first plain data key;

decrypting the first cypher data particle with the first plain data key to form a first plain data particle;

generating a second plain data key;

encrypting the first plain data particle with the second plain data key to form a second cypher data particle;

selecting, from the wrap key pool, a second plain wrap key and a second cypher wrap key comprising an encrypted form of the second plain wrap key, the second plain wrap key selectable to encrypt a first plurality of plain data keys;

encrypting the second plain data key with the second plain wrap key to form a second cypher data key; and transmitting, to the cloud data store, a second envelope, the second envelope formed from the second cypher wrap key, the second cypher data key, and the second cypher data particle.

7. The cryptographic system of claim 6, further comprising:

storing, in the wrap key pool, a first metric associated with the second plain wrap key, the first metric having a first value indicative of an availability of the second plain wrap key for encryption.

8. The cryptographic system of claim 6, further comprising:

determining a replenishment of the wrap key pool;

receiving, from the wrap key provider system, an other plain wrap key and an other cypher wrap key being an encrypted form of the other plain wrap key; and storing, in the wrap key pool, the other plain wrap key and the other cypher wrap key.

9. The cryptographic system of claim 6, further comprising:

receiving, from the cloud data store, a third envelope, the third envelope comprising a third cypher wrap key, a third cypher data key, and a third cypher data particle;

receiving a third plain wrap key being a decrypted form of the third cypher wrap key;

decrypting the third cypher data key with the third plain wrap key to form a third plain data key;

decrypting the third cypher data particle with the third plain data key to form a second plain data particle;

generating a fourth plain data key;

encrypting the second plain data particle with the fourth plain data key to form a fourth cypher data particle;

selecting, from the wrap key pool, a fourth plain wrap key and a fourth cypher wrap key being an encrypted form of the fourth plain wrap key, the fourth plain wrap key selectable to encrypt a second plurality of plain data keys;

encrypting the fourth plain data key with the fourth plain wrap key to form a fourth cypher data key; and transmitting, to the cloud data store, a fourth envelope, the fourth envelope formed from the fourth cypher wrap key, the fourth cypher data key, and the fourth cypher data particle.

10. The cryptographic system of claim 6, further comprising:

storing, in a wrap key cache, a second plurality of plain wrap keys and a second plurality of cypher wrap keys, each of the second plurality of cypher wrap keys being an encrypted form of a respective one of the second plurality of plain wrap keys, wherein receiving the first plain wrap key being a decrypted form of the first cypher wrap key is received from the wrap key cache.

11. A non-transitory computer-readable medium having a plurality of computer-executable instructions which, when executed by a processor coupled to a communication channel, perform a cryptographic method for use with a cloud data storage service, the instructions comprising:

a wrap key pool module configured to receive, from a wrap key provider system, a first plurality of plain wrap keys and a first plurality of cypher wrap keys, each of the first plurality of cypher wrap keys being an encrypted form of a respective one of the first plurality of plain wrap keys;

the wrap key pool module further configured to store, in a wrap key pool, the first plurality of plain wrap keys and the first plurality of cypher wrap keys, the storage process including determining individual use thresholds for each plain wrap key within the first plurality of plain wrap keys and each cypher wrap key within the first plurality of cypher wrap keys, the individual use thresholds being randomly determined and within a range of allowable thresholds, the individual use thresholds representing a maximum number of uses for each key having a threshold, wherein the storage operation replaces a key that has been used a number of times equal to or exceeding its threshold;

a cloud storage interface module configured to receive, from a cloud data store, a first envelope, the first envelope comprising a first cypher wrap key, a first cypher data key, and a first cypher data particle;

a cryptography engine configured to receive a first plain wrap key being a decrypted form of the first cypher wrap key;

the cryptography engine further configured to decrypt the first cypher data key with the first plain wrap key to form a first plain data key, the first cypher data particle being decryptable with the first plain data key to form a first plain data particle;

the wrap key pool module further configured to select, from the wrap key pool, a second plain wrap key and a second cypher wrap key being an encrypted form of the second plain wrap key, the second plain wrap key selectable to encrypt a first plurality of plain data keys;

the cryptography engine further configured to encrypt the
first plain data key with the second plain wrap key to
form a second cypher data key; and the cloud storage interface module further configured to
transmit, to the cloud data store, a second envelope, the
second envelope formed from the second cypher wrap
key, the second cypher data key, and the first cypher
data particle.

12. The non-transitory computer-readable medium of
claim 11, further comprising:

the wrap key pool module further configured to store, in
the wrap key pool, a first metric associated with the
second plain wrap key, the first metric having a first
value indicative of an availability of the second plain
wrap key for encryption.

13. The non-transitory computer-readable medium of
claim 11, further comprising:

the wrap key pool module further configured to determine
a replenishment of the wrap key pool;

the wrap key pool module further configured to receive,
from the wrap key provider system, an other plain wrap
key and an other cypher wrap key being an encrypted
form of the other plain wrap key; and the wrap key pool module further configured to store, in
the wrap key pool, the other plain wrap key and the
other cypher wrap key.

14. The non-transitory computer-readable medium of
claim 11, further comprising:

the cloud storage interface module further configured to
receive, from the cloud data store, a third envelope, the
third envelope comprising a third cypher wrap key, a
third cypher data key, and a second cypher data particle;

the cryptography engine further configured to receive a
third plain wrap key being a decrypted form of the third
cypher wrap key;

the cryptography engine further configured to decrypt the
third cypher data key with the third plain wrap key to
form a second plain data key, the second cypher data
particle being decryptable with the second plain data
key to form a second plain data particle;

the wrap key pool module further configured to select,
from the wrap key pool, a fourth plain wrap key and a
fourth cypher wrap key being an encrypted form of the
fourth plain wrap key, the fourth plain wrap key selectable to encrypt a second plurality of plain data keys;

the cryptography engine further configured to encrypt the
second plain data key with the fourth plain wrap key to
form a fourth cypher data key; and the cloud storage interface module further configured to
transmit, to the cloud data store, a fourth envelope, the
fourth envelope formed from the fourth cypher wrap
key, the fourth cypher data key, and the second cypher
data particle.

15. The non-transitory computer-readable medium of
claim 11, further comprising:

a wrap key cache module configured to store, in a wrap
key cache, a second plurality of plain wrap keys and a
second plurality of cypher wrap keys, each of the
second plurality of cypher wrap keys being an
encrypted form of a respective one of the second
plurality of plain wrap keys, wherein the receipt of the first plain wrap key being a
decrypted form of the first cypher wrap key is received
from the wrap key cache.

16. A non-transitory computer-readable medium having a
plurality of computer-executable instructions which, when
executed by a processor coupled to a communication channel, perform a cryptographic method for use with a cloud
data storage service, the instructions comprising:

a wrap key pool module configured to receive, from a
wrap key provider system, a first plurality of plain wrap
keys and a first plurality of cypher wrap keys, each of
the first plurality of cypher wrap keys being an
encrypted form of a respective one of the first plurality
of plain wrap keys;

the wrap key pool module further configured to store, in
a wrap key pool, the first plurality of plain wrap keys
and the first plurality of cypher wrap keys;

a cloud storage interface module configured to receive,
from a cloud data store, a first envelope, the first
envelope comprising a first cypher wrap key, a first
cypher data key, and a first cypher data particle;

a cryptography engine configured to receive a first plain
wrap key being a decrypted form of the first cypher
wrap key;

the cryptography engine further configured to decrypt the
first cypher data key with the first plain wrap key to
form a first plain data key;

the cryptography engine further configured to decrypt the
first cypher data particle with the first plain data key to
form a first plain data particle;

a data key generator configured to generate a second plain
data key;

the cryptography engine further configured to encrypt the
first plain data particle with the second plain data key
to form a second cypher data particle;

the wrap key pool module further configured to select,
from the wrap key pool, a second plain wrap key and
a second cypher wrap key being an encrypted form of
the second plain wrap key, the second plain wrap key
selectable to encrypt a first plurality of plain data keys;

the cryptography engine further configured to encrypt the
second plain data key with the second plain wrap key
to form a second cypher data key; and the cloud storage interface module further configured to
transmit, to the cloud data store, a second envelope, the
second envelope formed from the second cypher wrap
key, the second cypher data key, and the second cypher
data particle.

17. The non-transitory computer-readable medium of
claim 16, further comprising:

the wrap key pool module further configured to store, in
the wrap key pool, a first metric associated with the
second plain wrap key, the first metric having a first
value indicative of an availability of the second plain
wrap key for encryption.

18. The non-transitory computer-readable medium of
claim 16, further comprising:

the wrap key pool module further configured to determine
a replenishment of the wrap key pool;

the wrap key pool module further configured to receive,
from the wrap key provider system, an other plain wrap
key and an other cypher wrap key being an encrypted
form of the other plain wrap key; and the wrap key pool module further configured to store, in
the wrap key pool, the other plain wrap key and the
other cypher wrap key.

19. The non-transitory computer-readable medium of
claim 16, further comprising:

the cloud storage interface module further configured to
receive, from the cloud data store, a third envelope, the
third envelope comprising a third cypher wrap key, a
third cypher data key, and a third cypher data particle;

the cryptography engine further configured to receive a third plain wrap key being a decrypted form of the third cypher wrap key;

the cryptography engine further configured to decrypt the third cypher data key with the third plain wrap key to form a third plain data key;

the cryptography engine further configured to decrypt the third cypher data particle with the third plain data key to form a second plain data particle;

the data key generator further configured to generate a fourth plain data key;

the cryptography engine further configured to encrypt the second plain data particle with the fourth plain data key to form a fourth cypher data particle;

the wrap key pool module further configured to select, from the wrap key pool, a fourth plain wrap key and a fourth cypher wrap key being an encrypted form of the fourth plain wrap key, the fourth plain wrap key selectable to encrypt a second plurality of plain data keys;

the cryptography engine further configured to encrypt the fourth plain data key with the fourth plain wrap key to form a fourth cypher data key; and the cloud storage interface module further configured to transmit, to the cloud data store, a fourth envelope, the fourth envelope formed from the fourth cypher wrap key, the fourth cypher data key, and the fourth cypher data particle.

20. The non-transitory computer-readable medium of claim 16, further comprising:

a wrap key cache module configured to store, in a wrap key cache, a second plurality of plain wrap keys and a second plurality of cypher wrap keys, each of the second plurality of cypher wrap keys being an encrypted form of a respective one of the second plurality of plain wrap keys, wherein the receipt of the first plain wrap key being a decrypted form of the first cypher wrap key is received from the wrap key cache.

\* \* \* \* \*